US011687920B2

(12) United States Patent
Brudnicki et al.

(10) Patent No.: US 11,687,920 B2
(45) Date of Patent: Jun. 27, 2023

(54) FACILITATING A FUND TRANSFER BETWEEN USER ACCOUNTS

(71) Applicant: Apple Inc., Cupertino, CA (US)

(72) Inventors: David E. Brudnicki, Duvall, WA (US); Manoj K. Thulaseedharan Pillai, Cupertino, CA (US); Rupa B. Vazirani, Menlo Park, CA (US); Sunil Nair, Fremont, CA (US); Timothy S. Hurley, Los Gatos, CA (US); Matthew W. Strampe, Cedar Park, TX (US); Anish Bhatt, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/843,924

(22) Filed: Jun. 17, 2022

(65) Prior Publication Data
US 2022/0327528 A1    Oct. 13, 2022

Related U.S. Application Data

(63) Continuation of application No. 15/981,200, filed on May 16, 2018, now abandoned.

(60) Provisional application No. 62/507,026, filed on May 16, 2017.

(51) Int. Cl.
*G06Q 20/38* (2012.01)
*G06Q 20/32* (2012.01)
*G06Q 20/10* (2012.01)

(52) U.S. Cl.
CPC ......... *G06Q 20/3821* (2013.01); *G06Q 20/10* (2013.01); *G06Q 20/3226* (2013.01); *G06Q 20/3227* (2013.01); *G06Q 20/385* (2013.01); *G06Q 20/3829* (2013.01)

(58) Field of Classification Search
CPC ............... G06Q 20/3821; G06Q 20/10; G06Q 20/3226; G06Q 20/3227; G06Q 20/3829; G06Q 20/385
See application file for complete search history.

(56) References Cited

U.S. PATENT DOCUMENTS

| 7,123,608 | B1 * | 10/2006 | Scott ...................... H04L 67/30 370/353 |
| 9,516,018 | B1 * | 12/2016 | Vazquez ................. G06F 21/34 |
| 9,560,519 | B1 * | 1/2017 | McCracken, Jr. ..... H04W 12/08 |
| 9,674,162 | B1 * | 6/2017 | Miller ..................... H04L 63/06 |
| 9,866,393 | B1 | 1/2018 | Rush |
| 10,769,262 | B1 * | 9/2020 | Ziraknejad .............. G06F 21/45 |

(Continued)

FOREIGN PATENT DOCUMENTS

| CN | 101324950 | 12/2008 |
| CN | 105139200 | 12/2015 |

(Continued)

OTHER PUBLICATIONS

Anonymous: "Tokenization (data security)," Wikipedia, Feb. 24, 2017, 6 pages, https://en.wikipedia.org/wiki/Tokenization_(data_security).

(Continued)

*Primary Examiner* — Jacob C. Coppola
*Assistant Examiner* — Terry Nathan Murray
(74) *Attorney, Agent, or Firm* — BakerHostetler

(57) ABSTRACT

Systems, methods, and computer-readable media for facilitating a fund transfer between user accounts are provided.

20 Claims, 10 Drawing Sheets

(56) References Cited

U.S. PATENT DOCUMENTS

| | | | |
|---|---|---|---|
| 2003/0217101 A1* | 11/2003 | Sinn | H04L 61/4523 |
| | | | 709/203 |
| 2007/0198432 A1* | 8/2007 | Pitroda | G06Q 20/327 |
| | | | 705/64 |
| 2007/0255653 A1 | 11/2007 | Tumminaro et al. | |
| 2007/0294224 A1 | 12/2007 | Heler | |
| 2009/0144161 A1* | 6/2009 | Fisher | G06Q 20/3821 |
| | | | 705/16 |
| 2010/0070414 A1* | 3/2010 | Call | G06Q 30/06 |
| | | | 705/44 |
| 2011/0099384 A1 | 4/2011 | Grange | |
| 2011/0131643 A1 | 6/2011 | Lawrence | |
| 2011/0313921 A1* | 12/2011 | Dheer | G06Q 40/02 |
| | | | 705/42 |
| 2012/0215693 A1 | 8/2012 | Faith et al. | |
| 2012/0215810 A1 | 8/2012 | Evans | |
| 2012/0271762 A1 | 10/2012 | Freeland | |
| 2012/0284175 A1 | 11/2012 | Wilson et al. | |
| 2012/0284187 A1 | 11/2012 | Hammed et al. | |
| 2012/0291090 A1 | 11/2012 | Srinivasan | |
| 2014/0157404 A1 | 6/2014 | Chhabra et al. | |
| 2014/0344153 A1* | 11/2014 | Raj | G06Q 20/3821 |
| | | | 705/44 |
| 2015/0249651 A1 | 9/2015 | Okamoto | |
| 2015/0254634 A1* | 9/2015 | Fisher | G06Q 20/382 |
| | | | 705/40 |
| 2015/0324736 A1* | 11/2015 | Sheets | G06Q 10/08 |
| | | | 705/330 |
| 2016/0358172 A1 | 12/2016 | Ziat et al. | |
| 2017/0124558 A1 | 5/2017 | Molnar | |
| 2017/0132633 A1 | 5/2017 | Whitehouse | |
| 2017/0148018 A1 | 5/2017 | Levin | |
| 2017/0264681 A1 | 9/2017 | Apte | |
| 2017/0272253 A1* | 9/2017 | Lavender | H04L 63/12 |
| 2018/0089663 A1 | 3/2018 | Chen | |
| 2018/0321976 A1* | 11/2018 | Chen | H04L 67/60 |
| 2019/0246170 A1 | 8/2019 | Sreekanth | |

FOREIGN PATENT DOCUMENTS

| | | |
|---|---|---|
| CN | 105321068 | 2/2016 |
| CN | 106022743 A | 10/2016 |
| KR | 1020120039129 | 4/2012 |
| KR | 1020160047535 | 5/2016 |
| KR | 1020160119129 | 10/2016 |

OTHER PUBLICATIONS

Anonymous: "White Paper Mobile Payments," Mar. 7, 2017, 105 pages, downloaded from https://www.europeanpaymentscouncil.eu/sites/defaults/files/KB/files/EPC492-09%20v5.0%20White%20Paper%20Monile%20Payments%20-%20edition%202017.pdf.

International Preliminary Report on Patentability from PCT/US2018/032931, dated Nov. 28, 2019, 10 pages.

Korean Notice of Allowance from Korean Patent Application No. 10-2019-7034828, dated Aug. 4, 2021, 3 pages including English language summary.

Chinese Office Action from Chinese Patent Application No. 201880033494.X, dated Nov. 3, 2022, 29 pages including English language translation.

* cited by examiner

173 →

| Entry | U1/Sender's Device 100's Storage 173 |
|---|---|
| 173a | U1-ID; ED1-ID; LT-1; FX1-ID |
| 173b | ST-1a; PID-1a; Other Provision Data (SSD 154a) |
| 173c | ST-1b; PID-1b; Other Provision Data (SSD 154b) |

| Entry | U2/Receiver's Device 200's Storage 273 |
|---|---|
| 273a | U2-ID; ED2-ID; LT-2 |
| 273b | ST-2a; PID-2a; Other Provision Data (SSD 254a) |
| 273c | ST-2b; PID-2b; Other Provision Data (SSD 254b) |

| Entry | DPS 471's Table 473 |
|---|---|
| 473a | ED1-ID; LT-1; U1-ID; U1-PW |
| 473b | ED2-ID; LT-2; U2-ID; U2-PW |
| 473c | ED3-ID; LT-3; U1-ID; U1-PW |

| Entry | CPS 491's Table 493 |
|---|---|
| 493a | RT-1a; U1-ID; ED1-ID; PID-1a |
| 493b | RT-1b; U1-ID; ED1-ID; PID-1b |
| 493c | RT-2a; U2-ID; ED2-ID; PID-2a |
| 493d | RT-2b; U2-ID; ED2-ID; PID-2b |
| 493e | RT-1a; U1-ID; ED3-ID; PID-3a |

| Entry | TPS 481's Table 483 |
|---|---|
| 483a | MANDATE-ID; Fraud Request Data 540d; TRANSFER-ID |
| 483b | SENDX-ID; Send Transaction Fraud Data 562d-s |
| 483c | RECVX-ID; Receive Transaction Fraud Data 562d-r |

| Entry | 1st IS 391's Table 393 |
|---|---|
| 393a | AT-1a; RT-1a; ST-1a; U1-ID; ED1-ID; PID-1a; LT-1 |
| 393b | AT-1b; RT-1b; ST-1b; U1-ID; ED1-ID; PID-1b; LT-1 |
| 393c | AT-2b; RT-2b; ST-2b; U2-ID; ED2-ID; PID-2b; LT-2 |
| 393d | AT-1a; RT-1a; ST-3a; U1-ID; ED3-ID; PID-3a; LT-3 |

| Entry | 2nd IS 392's Table 394 |
|---|---|
| 394a | AT-2a; RT-2a; ST-2a; PID-2a; LT-2 |

| Entry | Network Table 395 |
|---|---|
| 395a | RT-1a; BID-1; LT-1; PID-1a |
| 395b | RT-1b; BID-1; LT-1; PID-1b |
| 395c | RT-2a; BID-2; LT-2; PID-2a |
| 395d | RT-2b; BID-1; LT-2; PID-2b |
| 395e | RT-1a; BID-1; LT-3; PID-3a |

FIG. 4H

FACILITATING A FUND TRANSFER BETWEEN USER ACCOUNTS

CROSS-REFERENCE TO RELATED APPLICATION(S)

This application is a continuation of U.S. patent application Ser. No. 15/981,200, entitled "Facilitating a Fund Transfer Between User Accounts", filed May 16, 2018, which claims the benefit of prior filed U.S. Provisional Patent Application No. 62/507,026, entitled "Facilitating a Fund Transfer Between User Accounts", filed May 16, 2017, each of which is hereby incorporated by reference herein in its entirety.

TECHNICAL FIELD

This disclosure relates to facilitating a fund transfer between user accounts, including to facilitating a fund transfer between user accounts using anonymous receive tokens.

BACKGROUND OF THE DISCLOSURE

Portable electronic devices (e.g., cellular telephones and laptop computers) may be provided with secure elements for enabling secure transaction communications with another entity. Often, these communications are associated with commercial transactions or other secure data transactions that require the electronic device to generate, access, and/or communicate a native payment credential, such as a credit card credential, from the secure element to a merchant via a merchant terminal or a merchant's website. However, use of such a native payment credential by the electronic device in other types of communications (e.g., transfers between two user accounts) has often been inefficient.

SUMMARY OF THE DISCLOSURE

This document describes systems, methods, and computer-readable media for facilitating a fund transfer between user accounts.

As an example, a method is provided for facilitating a transfer of funds between a first fund account of a credential issuer subsystem and a second fund account of the credential issuer subsystem using a first end-user host electronic device and a second end-user host electronic device and an administration entity subsystem, wherein the first fund account is linked to a first send token and a first receive token at the credential issuer subsystem, wherein the second fund account is linked to a second send token and a second receive token at the credential issuer subsystem, wherein the first end-user host electronic device is associated with a first social token at the administration entity subsystem, and wherein the second end-user host electronic device is associated with a second social token at the administration entity subsystem. The method may include, when a first user transaction credential associated with the first fund account is requested for use on the first end-user host electronic device, linking, by the administration entity subsystem, the first receive token to the first social token, and facilitating, by the administration entity subsystem, the provisioning of the first send token on to the first end-user host electronic device. The method may also include, when a second user transaction credential associated with the second fund account is requested for use on the second end-user host electronic device, linking, by the administration entity subsystem, the second receive token to the second social token, and facilitating, by the administration entity subsystem, the provisioning of the second send token on to the second end-user host electronic device. The method may also include, when the transfer of funds is requested, receiving, by the administration entity subsystem, from the first end-user host electronic device, device transfer funds request data that includes device payment credential data including the first send token, and the second social token, identifying, by the administration entity subsystem, the second receive token as linked to the second social token of the received device transfer funds request data, and communicating, by the administration entity subsystem, to the credential issuer subsystem, administration entity transfer funds request data that includes the identified second receive token and the first send token of the received device transfer funds request data.

As another example, a method is provided for facilitating a transfer of funds between a first fund account of a credential issuer subsystem and a second fund account of the credential issuer subsystem using a first end-user host electronic device and a second end-user host electronic device and an administration entity subsystem. The method may include, when a first user transaction credential associated with the first fund account is requested for use on the first end-user host electronic device, linking, by the credential issuer subsystem, a first receive token and a first send token to a first account token that is uniquely associated with the first fund account, communicating, by the credential issuer subsystem, to the administration entity subsystem, the first receive token, and provisioning, by the credential issuer subsystem, on to the first end-user host electronic device, the first send token. The method may also include, when a second user transaction credential associated with the second fund account is requested for use on the second end-user host electronic device, linking, by the credential issuer subsystem, a second receive token and a second send token to a second account token that is uniquely associated with the second fund account, communicating, by the credential issuer subsystem, to the administration entity subsystem, the second receive token, and provisioning, by the credential issuer subsystem, on to the second end-user host electronic device, the second send token. The method may also include, when the transfer of funds is requested, receiving, by the credential issuer subsystem, from the administration entity subsystem, an administration entity transfer funds request that includes device payment credential data including the first send token, a fund amount, and the second receive token, validating, by the credential issuer subsystem, the first send token of the device payment credential data of the administration entity transfer funds request, and, in response to the validating, communicating, by the credential issuer subsystem, the fund amount of funds, from the first fund account as linked to the validated first send token, to the second fund account as linked to the second receive token of the administration entity transfer funds request.

As yet another example, a method is provided for facilitating a transfer of funds between a first fund account of a credential issuer subsystem and a second fund account of the credential issuer subsystem using a first end-user host electronic device and a second end-user host electronic device and an administration entity subsystem, wherein the first fund account is linked to a first send token and a first receive token at the credential issuer subsystem, wherein the second fund account is linked to a second send token and a second receive token at the credential issuer subsystem, wherein the first end-user host electronic device is associated with a first social token at the administration entity subsystem, wherein the second end-user host electronic device is associated with a second social token at the administration entity subsystem, wherein the first end-user host electronic device includes a first user identifier and the first send token, and wherein the second end-user host electronic device includes a second user identifier and the second send token. The method may include receiving, by the administration entity subsystem, from the first end-user host electronic device, a device transfer funds request that includes device payment credential data including the first send token, a fund amount, the second social token, and a mandate key that includes a hash of the first user identifier and of the second social token. The method may also include determining, by the administration entity subsystem, a mandate identifier that includes a hash of the mandate key and of the first user identifier and of the second user identifier. The method may also include calculating, by the administration entity subsystem, a fraud risk of the device transfer funds request using the determined mandate identifier.

As yet another example, a method is provided for facilitating a transfer of funds between a first fund account of a first credential issuing subsystem and a second fund account of a second credential issuing subsystem using a first electronic device and a second electronic device and an administration entity ("AE") subsystem, wherein the first fund account is linked to a first send token and a first receive token at the first credential issuing subsystem, wherein the second fund account is linked to a second send token and a second receive token at the second credential issuing subsystem, wherein the first electronic device is associated with a first social token, and wherein the second electronic device is associated with a second social token. The method may include, when the provisioning of a first device credential associated with the first fund account is requested on the first electronic device, using the AE subsystem to store, at the AE subsystem, the first receive token against the first social token and provision first device credential data including the first send token on the first electronic device, when the provisioning of a second device credential associated with the second fund account is requested on the second electronic device, using the AE subsystem to store, at the AE subsystem, the second receive token against the second social token and provision second device credential data including the second send token on the second electronic device, and, when the transfer of funds is initiated by the first electronic device, using the AE subsystem to receive, at the AE subsystem from the first electronic device, device transfer funds request data that includes device payment credential data including the first send token and the second social token, identify, at the AE subsystem, the second receive token using the second social token of the device transfer funds request data, and communicate, from the AE subsystem to the first credential issuing subsystem, AE transfer funds request data that includes the identified second receive token and the received device payment credential data including the first send token.

This Summary is provided only to present some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which:

FIGS. 4A-4H are schematic diagrams of various example data structures of the system of FIG. 1.

DETAILED DESCRIPTION OF THE DISCLOSURE

Figure 1:
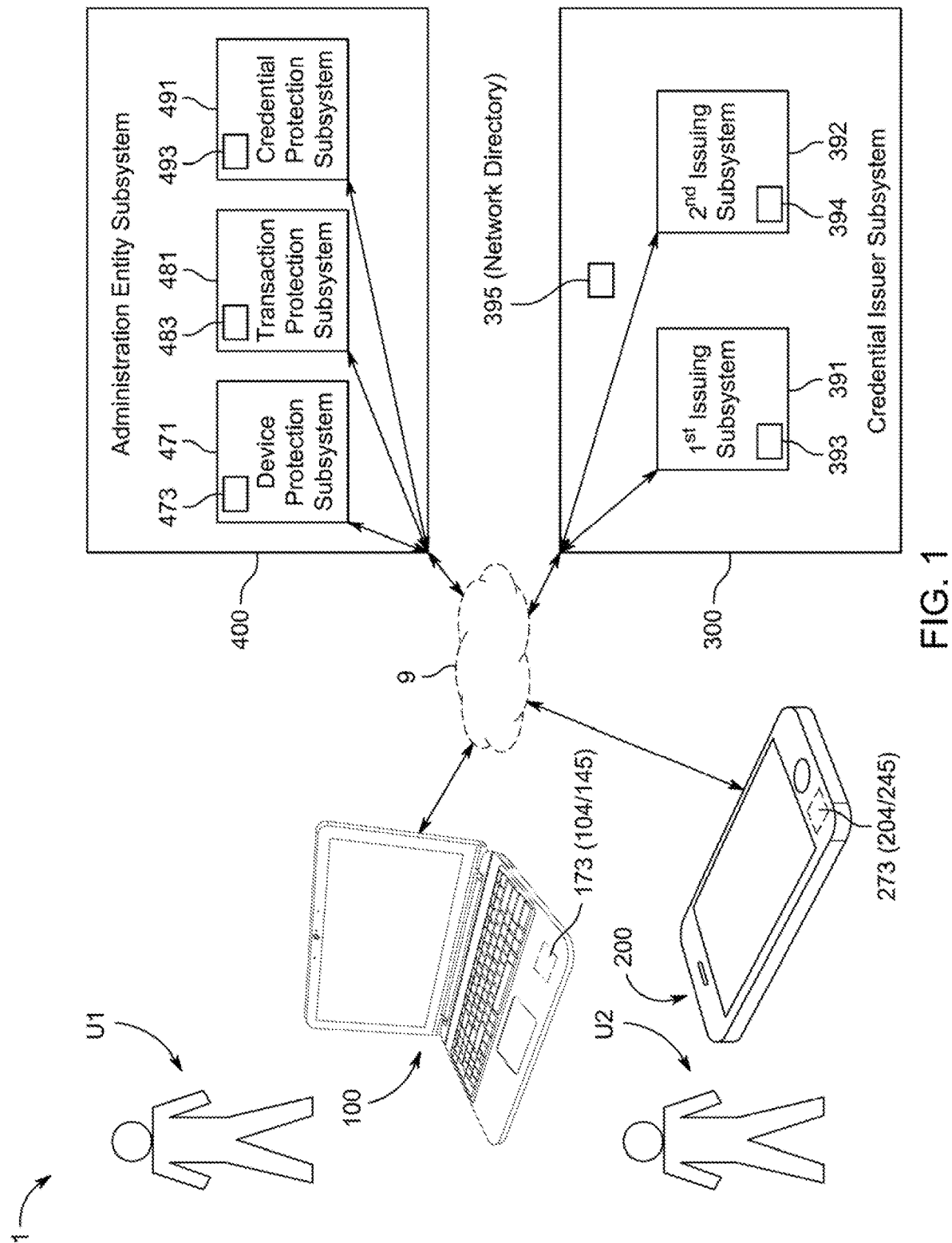
FIG. 1 is a schematic view of an illustrative system for facilitating a fund transfer between user accounts.

A first user credential (e.g., a payment credential or any other suitable transaction credential) of a first user fund account of a credential issuer subsystem may be provisioned on a secure element of a first electronic device for use by an authenticated user, while a second user credential of a second user fund account of the credential issuer subsystem may be provisioned on the same first electronic device or on a second electronic device for use by an authenticated user. Unique data that may be user-anonymous and/or fund account-anonymous may be linked at the credential issuer subsystem to a particular user fund account and then shared with an administration entity subsystem to facilitate secure fund transfers between different user accounts at the credential issuer subsystem. Such an administration entity subsystem may be operated by an administration entity for providing a layer of security and/or for providing a more convenient user experience to the use of such user credentials. A device protection subsystem of such an administration entity subsystem may be operative to provide one or more device protection services for protecting an electronic device (e.g., if the device were to be reported lost or stolen and/or for shielding an association between the device and an identity of a particular user registered to the device) and/or for enabling certain device to device communications, while a credential protection subsystem of such an administration entity subsystem may be operative to manage the provisioning of user credentials on electronic devices from a credential issuer subsystem and to facilitate the secure use of a user credential provisioned on a sender device in funding a transfer from a sender user account to a receiver user account at the credential issuer subsystem. The administration entity subsystem may be operative to enable a sender user to utilize a credential provisioned on a sender user device as well as a receiver social token (e.g., e-mail address or telephone number) associated with a receiver user (e.g., as may be identified in a contacts application of the sender user device) to initiate a transfer of funds from a sender fund account at the credential issuer subsystem associated with the provisioned credential to a receiver fund account at the credential issuer subsystem associated with the receiver social token. However, in such embodiments, in order to limit the potential for privacy and/or security breaches, the administration entity subsystem may be operative to prevent any of its particular subsystems (e.g., the device protection subsystem and/or the credential protection subsystem and/or any transaction protection subsystem) from storing any information that may specifically link two or more particular users to a particular fund transfer (e.g., the identity of the sender device and data indicative of the receiver account). Instead, a system of the disclosure may use user-anonymous and/or fund account-anonymous receive tokens, each of which may be associated with a particular receiver fund account at the credential issuer subsystem and with a particular user (e.g., a particular receiver social token) of an electronic device at the credential protection subsystem but not with a particular user at the device protection subsystem, such that no subsystem of the administration entity subsystem may have access to data that may be used to identify two or more particular users with respect to a particular transaction.

Description of FIG. 1

FIG. 1 is a schematic view of an illustrative system 1 that may allow for the facilitating transfer of funds between user accounts. For example, as shown in FIG. 1, system 1 may include a first end-user host electronic device 100 (e.g., a laptop computer (see, e.g., FIG. 1) or a smart phone (see, e.g., FIG. 3) or a wearable device or the like) with at least one first user credential of a first user U1 provisioned thereon (e.g., on a secure element of first electronic device 100). Moreover, as also shown in FIG. 1, system 1 may include a second end-user host electronic device 200 (e.g., a smart phone (see, e.g., FIG. 1) or a laptop computer or a wearable device or the like) with at least one second user credential of a second user U2 provisioned thereon (e.g., on a secure element of second electronic device 200). Additionally or alternatively, first end-user host electronic device 100 may have at least one second user credential of second user U2 provisioned thereon in addition to at least one first user credential of first user U1 provisioned thereon. System 1 may also include an administration (or commercial or trusted) entity subsystem 400, and a credential issuer (or financial institution) subsystem 300. Communication of any suitable data between any two of electronic device 100, electronic device 200, administration entity ("AE") subsystem 400, credential issuer ("CI") subsystem 300, and/or any other entities of system 1 (e.g., a service provider (e.g., merchant) subsystem) may be enabled via any suitable communications set-up 9, which may include any suitable wired communications path, any suitable wireless communications path, or any suitable combination of two or more wired and/or wireless communications paths using any suitable communications protocol(s) and/or any suitable network(s) and/or cloud architecture(s). Each communications path between any two devices or subsystems of system 1 using communications set-up 9 may be at least partially managed by one or more trusted service managers ("TSMs"). Any suitable circuitry, device, system, or combination of these (e.g., a wireless communications infrastructure that may include one or more communications towers, telecommunications servers, or the like) that may be operative to create a communications network may be used to provide one or more of such communications paths, which may be capable of providing communications using any suitable wired or wireless communications protocol. For example, one or more of such communications paths may support Wi-Fi (e.g., an 802.11 protocol), ZigBee (e.g., an 802.15.4 protocol), WiDi™, Ethernet, Bluetooth™, BLE, high frequency systems (e.g., 900 MHz, 2.4 GHz, and 5.6 GHz communication systems), infrared, TCP/IP, SCTP, DHCP, HTTP, BitTorrent™, FTP, RTP, RTSP, RTCP, RAOP, RDTP, UDP, SSH, WDS-bridging, any communications protocol that may be used by wireless and cellular telephones and personal e-mail devices (e.g., GSM, GSM plus EDGE, CDMA, OFDMA, HSPA, multi-band, etc.), any communications protocol that may be used by a low power Wireless Personal Area Network ("6LoWPAN") module, any other communications protocol, or any combination thereof. In some implementations, one or more of such communications paths may, additionally or alternatively, support any wired communication.

A transaction credential (e.g., a payment credential or any other suitable transaction credential) may be provisioned on first electronic device 100 (e.g., on a secure element or other storage component of first electronic device 100) from any suitable credential issuer subsystem 300 (e.g., an issuing bank subsystem or financial institution subsystem), either directly from CI subsystem 300 or via AE subsystem 400, which may be operative to securely communicate credential data onto first device 100 and manage such credential data. For example, CI subsystem 300 may include a first issuing subsystem ("IS") 391 that may be operated by at least one first credential issuing institution (e.g., a first issuing bank, such as Wells Fargo of San Francisco, Calif.) with or without a first payment network institution (e.g., a first payment network, such as MasterCard of Purchase, N.Y.) for provisioning at least one first user transaction credential on first device 100 (e.g., directly or via AE subsystem 400 (e.g., via a credential protection subsystem 491 of AE subsystem 400)) for first user U1. CI subsystem 300 may include a second issuing subsystem 392 that may be operated by at least one second credential issuing institution (e.g., a second issuing bank, such as Citibank of Sioux Falls, S. Dak.) with or without a second payment network institution (e.g., a second payment network, such as Visa of Foster City, Calif.) for provisioning at least one second user transaction credential on first device 100 and/or on second device 200 (e.g., directly or via AE subsystem 400 (e.g., via credential protection subsystem 491 of AE subsystem 400)) for second user U2. It is to be understood, however, that first issuing subsystem 391 may be operative to provision one or more first user transaction credentials on first device 100 for first user U1 as well as one or more second user transaction credentials on first device 100 and/or on second device 200 for second user U2, where no issuing subsystem may only be used to provision transaction credentials for a particular user. Moreover, each issuing subsystem may be operative to manage one or more user fund accounts (e.g., bank accounts) that may have funds associated therewith for use in funding a transaction or that may be operative to receive funds in a transaction being funded by another account, where each user fund account may be associated with one or more transaction credentials that may be provisioned on a user electronic device of system 1. Once provisioned on an electronic device, a transaction credential may then be used by that device for securely funding or otherwise conducting a transaction (e.g., a commercial or financial transaction or any other suitable credential transaction) between a first or sender user fund account of an issuing subsystem of subsystem 300 that is associated with that transaction credential as provisioned on the electronic device (e.g., first or sender electronic device 100) and any suitable second or receiver user fund account of an issuing subsystem of subsystem 300 (e.g., a receiver user fund account that may be associated with a credential provisioned on another device (e.g., second or receiver electronic device 200)). For example, while also identifying with first device 100 (e.g., using any suitable user interface (e.g., of a contacts application or electronic address book or phone book or the like) of first device 100) any suitable receiver identifier (e.g., any suitable social receiver identifier) that may be associated with at least one receiver user account of an issuing subsystem of subsystem 300 (e.g., a social identifier identifying a second device 200 on which may be provisioned a credential associated with the receiver user account), first device 100 may also identify a particular transaction credential provisioned on first device 100 to be used (e.g., by CI subsystem 300) for identifying a sender user account associated with the provisioned transaction credential for funding or otherwise furthering a transaction with the receiver user account that may be associated with the identified receiver identifier.

AE subsystem 400 may include credential protection subsystem 491 that may be operative to provide an additional layer of security and/or efficiency to the provisioning of credentials on first device 100 and/or to the utilizing of credential data provisioned on first device 100 for funding a receiver user account of an issuing subsystem of subsystem 300 (e.g., a receiver user account that may be associated with a credential provisioned on another device (e.g., second or receiver electronic device 200)). For example, credential protection subsystem 491 may be operative to validate the trustworthiness of one or more issuing subsystems of CI subsystem 300 on behalf of device 100 prior to enabling credential provisioning from an issuing subsystem onto device 100, and/or credential protection subsystem 491 may be operative to encrypt, encode, or otherwise secure the communication of transaction credential information from an issuing subsystem to device 100 for ensuring secure credential provisioning on device 100. Additionally or alternatively, credential protection subsystem 491 may be operative to validate the trustworthiness of a receiver user account identified by device 100 prior to enabling transaction credential data (e.g., sender transaction credential data or sender device payment credential data) from device 100 to be shared for use in funding that receiver user account. Additionally or alternatively, credential protection subsystem 491 may be operative to encrypt, encode, or otherwise secure the communication of transaction credential data from device 100 to CI subsystem 300 for ensuring secure transaction credential data sharing while furthering a transaction between device 100 and a receiver user account of issuer subsystem 300. Additionally or alternatively, credential protection subsystem 491 may be operative to facilitate secure a fund transfer between user accounts by maintaining data operative to associate an identifier of a particular registered user of AE subsystem 400 with at least one particular user-anonymous and/or fund account-anonymous receive token that may be linked at CI subsystem 300 to a particular user fund account.

Moreover, AE subsystem 400 may include a device protection subsystem 471 that may be operative to provide an additional layer of security to a system device (e.g., if device 100 were to be lost or stolen). Device protection subsystem 471 may enable a user of device 100 to register device 100 with AE subsystem 400 for receiving one or more support services of device protection subsystem 471. One or more services of device protection subsystem 471 may be operative to track the location of a registered device 100 and/or remotely control one or more functions of a registered device 100, such as turn on an alarm and/or erase or suspend or otherwise terminate the usefulness of certain device content, such as suspend the ability for the secure element of device 100 to generate transaction credential data for use in furthering a transaction with a receiver user account or service provider. Such services may be useful to a device owner when device 100 may be lost or stolen such that the device may be recovered and/or such that sensitive data on the device may not be accessed. Additionally or alternatively, device protection subsystem 471 may be operative to associate certain social tokens (e.g., e-mail addresses, telephone numbers, etc.) with certain registered devices and/or to enable certain secure communications between registered devices and/or to associate certain registered devices with a certain AE user account of AE subsystem 400. Moreover, AE subsystem 400 may include a transaction protection subsystem 481 that may be operative to provide an additional layer of security for determining a risk associated with a proposed transaction being facilitated by AE subsystem 400 and/or storing certain user-anonymous and/or account-anonymous data that may be associated with particular transactions facilitated by AE subsystem 400.

However, as mentioned, in order to limit the potential for privacy and/or security breaches, AE subsystem 400 may be operative to prevent any of its particular subsystems (e.g., device protection subsystem 471, credential protection subsystem 481, and/or transaction protection subsystem 481) from storing (e.g., retaining and/or associating in memory) any information that may specifically link two or more particular users to a particular fund transfer (e.g., the identity of a sender device and data indicative of a receiver account). Instead, system 1 may be operative to use user-anonymous and/or fund account-anonymous receive tokens, each of which may be associated with a particular receiver fund account at CI subsystem 300 and with a particular user and/or device (e.g., with a particular device identifier and/or user identifier and/or receiver social token that may be registered to an electronic device) at credential protection subsystem 491 but not with a particular user at device protection subsystem 471, such that no subsystem of AE subsystem 400 may have access to (e.g., no entry of any table of any subsystem of AE subsystem 400 may include) data that may be used to identify two or more particular users with respect to a particular transaction, and/or such that no receiver fund-account identifying information may need to be handled by a sender device communicating sender device payment credential data for funding a transfer transaction to a receiver fund account.

Figure 2:
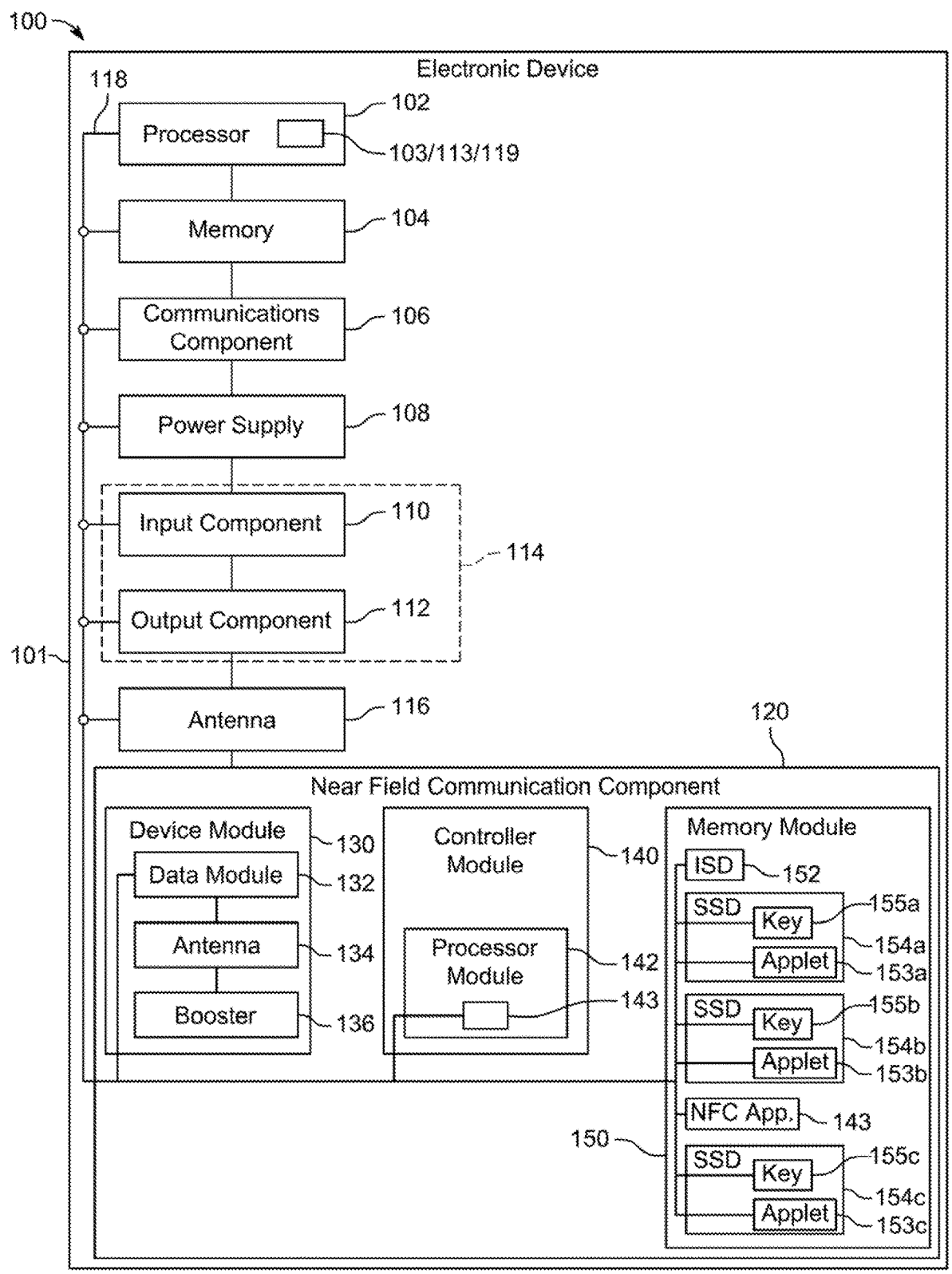
FIG. 2 is a more detailed schematic view of an example of one of the electronic devices of the system of FIG. 1.
Figure 2A:
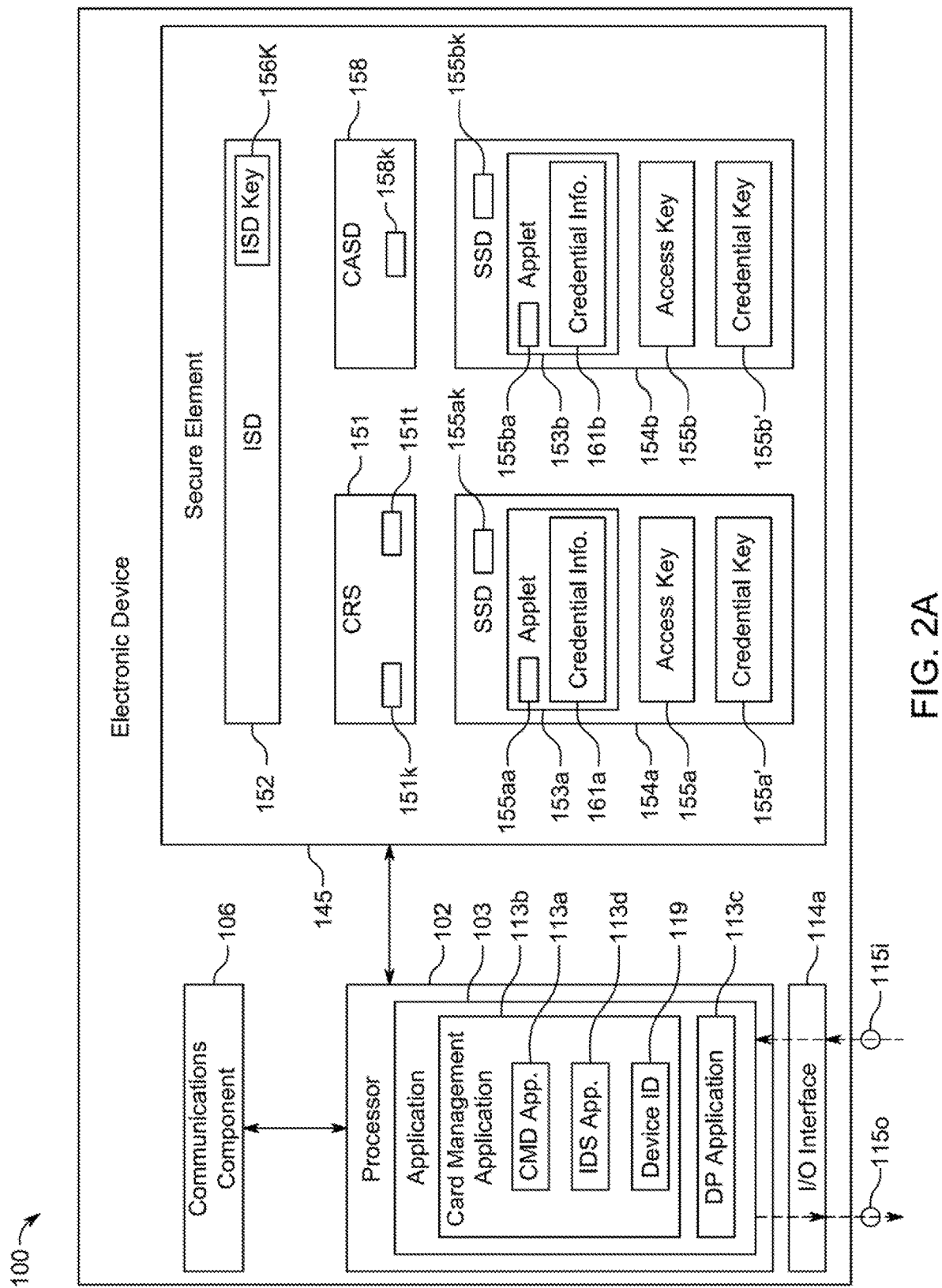
FIG. 2A is another more detailed schematic view of the electronic device of FIGS. 1 and 2.
Figure 3:
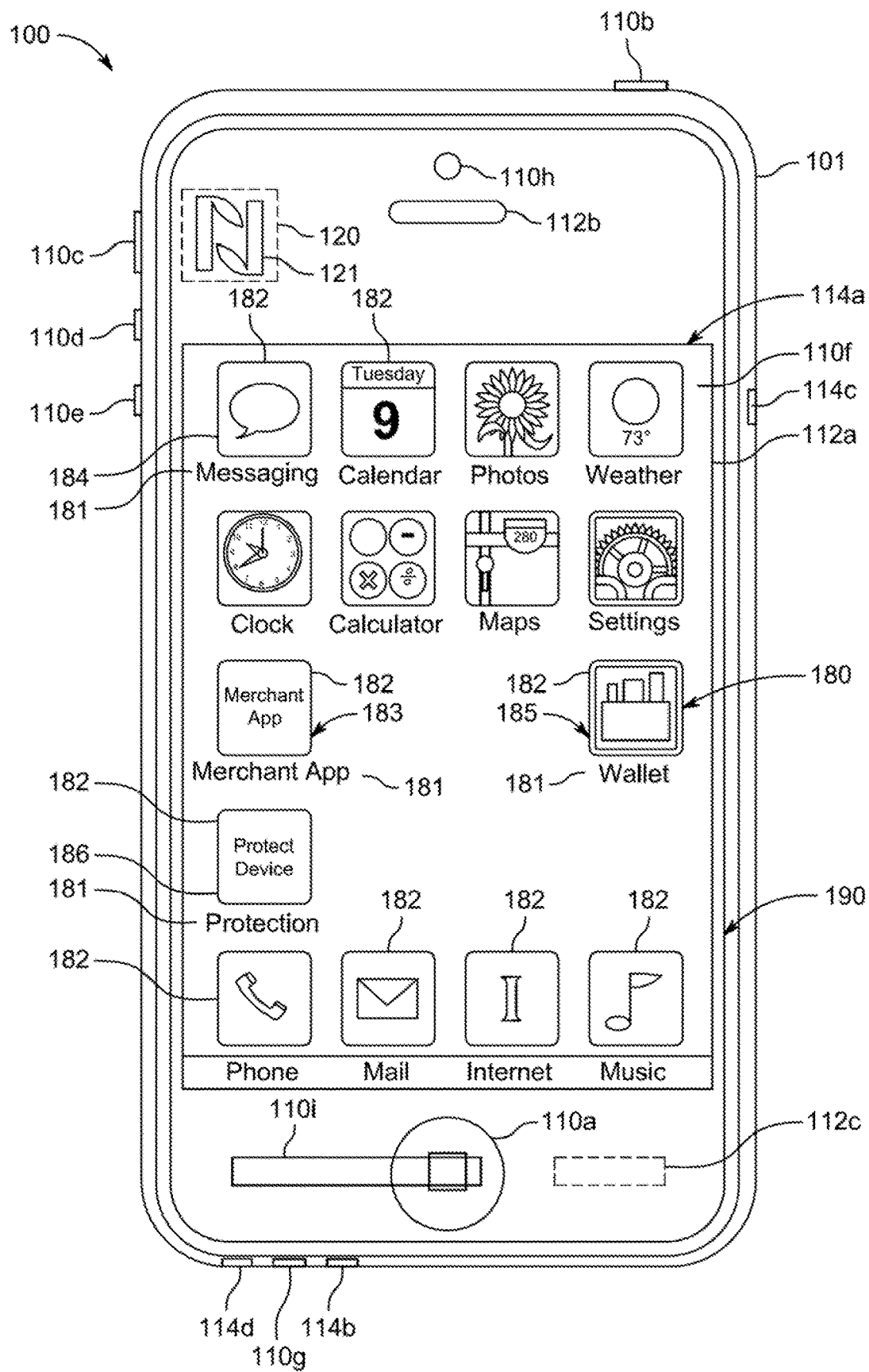
FIG. 3 is a front view of the electronic device of FIGS. 1, 2, and 2A.

Description of FIG. 2, FIG. 2A, and FIG. 3

FIG. 2 shows a more detailed view of example user electronic device 100 of system 1. As shown in FIG. 2, for example, device 100 may include a processor 102, memory 104, communications component 106, power supply 108, input component 110, output component 112, antenna 116, and near field communication component 120. Device 100 may also include a bus 118 that may provide one or more wired or wireless communication links or paths for transferring data and/or power to, from, or between various other components of device 100. Device 100 may also be provided with a housing 101 that may at least partially enclose one or more of the components of device 100 for protection from debris and other degrading forces external to device 100. In some embodiments, one or more components of device 100 may be combined or omitted. Moreover, device 100 may include other components not combined or included in FIG. 2. For example, device 100 may include any other suitable components or several instances of the components shown in FIG. 2. For the sake of simplicity, only one of each of the components is shown in FIG. 2. Electronic device 100 may be any portable, mobile, wearable, implantable, or hand-held electronic device configured to store one or more transaction credentials for use in furthering a transaction with a receiver user account. Alternatively, electronic device 100 may not be portable during use, but may instead be generally stationary. Electronic device 100 can include, but is not limited to, a media player, video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet, server, etc.), monitor, television, stereo equipment, set up box, set-top box, wearable device (e.g., an Apple Watch™ by Apple Inc.), boom box, modem, router, printer, and any combinations thereof.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music and image files), software (e.g., applications for implementing functions on device 100), firmware, preference information (e.g., media playback preferences), lifestyle information (e.g., food preferences), exercise information (e.g., information obtained by exercise monitoring equipment), transaction information, wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof. Communications component 106 may be operative to enable device 100 to communicate with one or more other electronic devices (e.g., device 200) or servers or subsystems (e.g., one or more of subsystems 300 and 400) using any suitable communications protocol(s) (e.g., wired and/or wireless protocol(s) via communications set-up 9). Power supply 108 may provide power to one or more of the components of device 100. In some embodiments, power supply 108 can be coupled to a power grid (e.g., when device 100 is being charged or is not a portable device, such as a desktop computer). In some embodiments, power supply 108 can include one or more batteries for providing power (e.g., when device 100 is a portable device, such as a cellular telephone). As another example, power supply 108 can be configured to generate power from a natural source (e.g., solar power using solar cells). One or more input components 110 may be provided to permit a user or the ambient environment or remote data sources to interact or interface with device 100 and/or one or more output components 112 may be provided to present information (e.g., graphical, audible, and/or tactile information) to a user of device 100.

It should be noted that one or more input components and one or more output components may sometimes be referred to collectively herein as an input/output ("I/O") component or I/O interface 114 (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen.

Processor 102 of device 100 may include any processing circuitry that may be operative to control the operations and performance of one or more components of device 100. For example, processor 102 may receive input signals from input component 110 and/or drive output signals through output component 112. Processor 102 of host device 100 may include any suitable processing circuitry that may be operative to control the operations and performance of one or more components of host device 100. As shown in FIG. 2, processor 102 may be used to run one or more applications (e.g., an application 103 and/or an application 113) that may at least partially dictate the way in which data may be received by, generated at, and/or communicated from device 100. As one example, application 103 may be an operating system application while application 113 may be a third party application or any other suitable online resource (e.g., a contacts or address book application, a protection application and/or device-to-device communication application (e.g., a communication application associated with device protection subsystem 471 of AE subsystem 400), a credential issuer application (e.g., a credential issuer application associated with a credential issuing subsystem of CI subsystem 300), an application associated with a merchant of a service provider ("SP") subsystem (not shown), etc.). Moreover, as shown, processor 102 may have access to any suitable device identification information 119, which may be utilized by a user of device 100 and/or AE subsystem 400 and/or issuer subsystem 300 and/or any SP subsystem for providing any suitable identification of device 100. As just one example, device identification information 119 may be any suitable social token (e.g., telephone number or e-mail address associated with device 100) or any suitable unique identifier that may be associated with device 100 or a component thereof (e.g., a unique device identifier of device 100 or a unique secure element identifier of a secure element of device 100 or the like).

Near field communication ("NFC") component 120 may be configured to communicate transaction credential data (e.g., sender transaction credential data or sender device payment credential data) and/or any other suitable data as a contactless proximity-based communication (e.g., near field communication) with a merchant or SP subsystem (not shown) (e.g., with an SP NFC terminal of an SP subsystem that may be located at a brick and mortar store or any physical location at which a user of device 100 may use a credential to conduct a transaction with a proximately located SP terminal via a contactless proximity-based communication). NFC component 120 may allow for close range communication at relatively low data rates (e.g., 424 kbps), and may comply with any suitable standards, such as ISO/IEC 7816, ISO/IEC 18092, ECMA-340, ISO/IEC 21481, ECMA-352, ISO 14443, and/or ISO 15693. NFC component 120 may allow for close range communication at relatively high data rates (e.g., 370 Mbps), and may comply with any suitable standards, such as the TransferJet™ protocol. Communication between NFC component 120 and an NFC component of an SP subsystem or any other suitable entity of system 1 may occur within any suitable close range distance between the NFC component and the other entity, such as a range of approximately 2 to 4 centimeters, and may operate at any suitable frequency (e.g., 13.56 MHz). For example, such close range communication of an NFC component may take place via magnetic field induction, which may allow the NFC component to communicate with other NFC devices and/or to retrieve information from tags having radio frequency identification ("RFID") circuitry. While NFC component 120 may be described with respect to near field communication, it is to be understood that component 120 may be configured to provide any suitable contactless proximity-based mobile payment or any other suitable type of contactless proximity-based communication between device 100 and another entity, such as a terminal of an SP subsystem. For example, NFC component 120 may be configured to provide any suitable short-range communication, such as those involving electromagnetic/electrostatic coupling technologies.

NFC component 120 may include any suitable modules for enabling contactless proximity-based communication between device 100 and such a remote terminal (e.g., an SP terminal). As shown in FIG. 2, for example, NFC component 120 may include an NFC device module 130, an NFC controller module 140, and/or an NFC memory module 150. NFC device module 130 may include an NFC data module 132, an NFC antenna 134, and an NFC booster 136. NFC data module 132 may be configured to contain, route, or otherwise provide any suitable data that may be transmitted by NFC component 120 to a remote terminal as part of a contactless proximity-based or NFC communication. NFC data module 132 may be configured to contain, route, or otherwise receive any suitable data that may be received by NFC component 120 from a remote terminal as part of a contactless proximity-based communication. NFC controller module 140 may include at least one NFC processor module 142. NFC processor module 142 may operate in conjunction with NFC device module 130 to enable, activate, allow, and/or otherwise control NFC component 120 for communicating an NFC communication between device 100 and a remote terminal. NFC controller module 140 may include at least one NFC processor module 142 that may be used to run one or more applications, such as an NFC low power mode or wallet application 143 that may help dictate the function of NFC component 120. NFC memory module 150 may operate in conjunction with NFC device module 130 and/or NFC controller module 140 to allow for NFC communications between device 100 and a remote terminal. NFC memory module 150 may be tamper resistant and may provide at least a portion of a secure element 145 of device 100. For example, secure element 145 may be configured to provide a tamper-resistant platform (e.g., as a single-chip or multiple-chip secure microcontroller) that may be capable of securely hosting applications and their confidential and cryptographic data (e.g., applets 153 and keys 155) in accordance with rules and security requirements that may be set forth by a set of well-identified trusted authorities (e.g., an authority of a CI subsystem and/or a financial institution subsystem and/or an industry standard, such as GlobalPlatform).

As shown, for example, NFC memory module 150 may include one or more of an issuer security domain ("ISD") 152, one or more supplemental security domains ("SSDs") 154*a*-154*c* (e.g., a service provider security domain ("SPSD"), a trusted service manager security domain ("TSMSD"), credential SSD, access SSD, etc.), which may be defined and managed by an NFC specification standard (e.g., GlobalPlatform). For example, ISD 152 may be a portion of NFC memory module 150 in which a trusted service manager ("TSM") or issuing financial institution (e.g., issuer subsystem 300) may store one or more keys (e.g., ISD key 156*k*) and/or other suitable information for creating or otherwise provisioning one or more credentials (e.g., credentials associated with various credit cards, bank cards, gift cards, access cards, transit passes, digital currency (e.g., bitcoin and associated payment networks), etc.) on device 100 (e.g., via communications component 106), for credential content management, and/or security domain management. A credential may include credential data (e.g., credential information 161*a*) that may be assigned to a user/consumer (e.g., by an issuing subsystem) and that may be stored securely on electronic device 100 and/or uniquely generated on electronic device 100. For example, such credential data (e.g., credential information 161*a*) may include a device primary account number ("DPAN") or send token (e.g., a 16-19 character token, which may be similar to a credit/debit card number that may be compatible with various card networks, or a device account reference ("DAR") (e.g., a well-defined formatted string, which may contain a globally unique identifier ("GUID") or a universally unique identifier ("UUID") (e.g., a 128-bit integer number that may be used to identify one or more resources) and/or a code (e.g., a bank code) that may identify a particular source (e.g., issuing subsystem))), DPAN expiry date, CVV, and/or the like (e.g., as a token or otherwise). NFC memory module 150 may include at least three SSDs 154 (e.g., first credential SSD 154*a*, second credential SSD 154*b*, and access SSD 154*c*). For example, each one of first credential SSD 154*a* and second credential SSD 154*b* may be associated with a respective specific credential of any suitable type (e.g., a specific credit card credential or a specific stored value account credential or a specific public transit card credential provisioned by issuer subsystem 300) that may provide specific privileges or payment rights to electronic device 100, while access SSD 154*c* may be associated with a commercial or administration entity (e.g., an entity of AE subsystem 400, which may be a controlling entity for device 100) that may control access of device 100 to a specific credential of another SSD (e.g., first SSD 154*a* or second SSD 154*b*), for example, to provide specific privileges or payment rights to electronic device 100. Each SSD 154 may include and/or be associated with at least one applet 153 (e.g., SSD 154*a* with applet 153*a* and SSD 154*b* with applet 153*b*). For example, an applet 153 of an SSD 154 may be an application that may run on a secure element of NFC component 120 (e.g., in a GlobalPlatform environment). A credential applet 153 may include or be associated with credential information 161 (e.g., information 161*a* of applet 153*a* and/or information 161*b* of applet 153*b*). Each SSD 154 and/or applet 153 may also include and/or be associated with at least one of its own keys 155 (e.g., applet 153*a* with at least one access key 155*a* and at least one credential key 155*a*', and applet 153*b* with at least one access key 155*b* and at least one credential key 155*b*').

A key 155 of an SSD 154 may be a piece of information that can determine a functional output of a cryptographic algorithm or cipher. For example, in encryption, a key may specify a particular transformation of plaintext into ciphertext, or vice versa during decryption. Keys may also be used in other cryptographic algorithms, such as digital signature schemes and message authentication codes. A key of an SSD may provide any suitable shared secret with another entity. Each key and applet may be loaded on the secure element of device 100 by a TSM or an authorized agent or pre-loaded on the secure element before the secure element is first provided on device 100. As one example, while credential SSD 154a may be associated with a particular credit card credential, that particular credential may only be used to communicate a transaction credential data communication from secure element 145 of device 100 to a remote entity for a financial transaction (e.g., for funding a receiver user account) when applet 153a of that credential SSD 154a has been enabled or otherwise activated or unlocked for such use. Some keys may be generated on-board a secure element or other suitable portion of device 100.

Security features may be provided for enabling use of NFC component 120 that may be particularly useful when transmitting credential information (e.g., confidential payment information, such as credit card information or bank account information of a credential) from electronic device 100 to a remote entity (e.g., for funding a receiver user account of CI subsystem 300 (e.g., via AE subsystem 400)) and/or to electronic device 100 from issuer subsystem 300 (e.g., for provisioning on the secure element of device 100) (e.g., via AE subsystem 400)). Such security features also may include a secure storage area that may have restricted access. For example, user authentication via personal identification number ("PIN") entry or via user interaction with a biometric sensor may need to be provided to access the secure storage area. As an example, access SSD 154c may leverage or otherwise use applet 153c to determine whether such authentication has occurred before allowing other SSDs 154 (e.g., credential SSD 154a or credential SSD 154b) to be used for communicating its credential information 161. In certain embodiments, some or all of the security features may be stored within NFC memory module 150. Further, security information, such as an authentication key, for communicating commerce credential data with a remote entity may be stored within NFC memory module 150 of electronic device 100. In certain embodiments, NFC memory module 150 may include a microcontroller embedded within electronic device 100. As just one example, applet 153c of access SSD 154c may be configured to determine intent and local authentication of a user of device 100 (e.g., via one or more input components 110, such as a biometric input component) and, in response to such a determination, may be configured to enable another particular SSD for conducting a payment transaction (e.g., with a credential of credential SSD 154a).

As shown in FIG. 2A, for example, secure element 145 of NFC component 120 may include SSD 154a, which may include or be associated with applet 153a, credential information 161a, access key 155a, and/or credential key 155a', and SSD 154b, which may include or be associated with applet 153b, credential information 161b, access key 155b, and/or credential key 155b'. In some embodiments, each one of SSDs 154a and 154b may be associated with a particular TSM and at least one specific commerce credential (e.g., a specific credit card credential or a specific stored value account credential or a specific public transit card credential) that may provide specific privileges or payment rights to electronic device 100 (e.g., SSD 154a may be associated with a first transaction credential provisioned for user U1 from first issuing subsystem 391 of issuer subsystem 300 and SSD 154b may be associated with a second transaction credential provisioned for user U1 from first issuing subsystem 391 of issuer subsystem 300). Each SSD 154 may have its own manager key 155 (e.g., a respective one of keys 155ak and 155bk) that may need to be activated to enable a function of that SSD 154 for use by NFC device module 130. Each SSD 154 may include and/or be associated with at least one of its own credential applications or credential applets (e.g., a Java card applet instances) associated with a particular commerce credential (e.g., credential applet 153a of SSD 154a may be associated with a first commerce credential and/or credential applet 153b of SSD 154b may be associated with a second commerce credential), where a credential applet may have its own access key (e.g., access key 155a for credential applet 153a and/or access key 155b for credential applet 153b) and/or its own credential key (e.g., credential key 155a' for credential applet 153a and/or credential key 155b' for credential applet 153b), and where a credential applet may need to be activated to enable its associated commerce credential for use by NFC device module 130 as an NFC communication (e.g., with a remote terminal) and/or as an online-based communication between device 100 and a remote entity (e.g., between device 100 and CI subsystem 300 (e.g., via AE subsystem 400)).

A credential key of a credential applet may be generated by CI subsystem 300, which may be responsible for such a credential, and may be accessible by that issuer subsystem 300 for enabling secure transmission of that credential information of that applet between secure element 145 and issuer subsystem 300. An access key of a credential applet may be generated by AE subsystem 400 and may be accessible by AE subsystem 400 for enabling secure transmission of that credential information of that applet between secure element 145 and AE subsystem 400. As shown, each applet may include its own unique application identifier ("AID"), such as AID 155aa of applet 153a and/or AID 155ba of applet 153b. For example, an AID may identify a specific card scheme and product, program, or network (e.g., MasterCard Cirrus, Visa PLUS, Interac, etc.), where an AID may include not only a registered application provider identifier ("RID") that may be used to identify a payment system (e.g., card scheme) or network (e.g., MasterCard, Visa, Interac, etc.) of the credential associated with the AID but also a proprietary application identifier extension ("PIX") that may be used to differentiate between products, programs, or applications offered by a provider or payment system of the credential associated with the AID. Any suitable specification (e.g., a Java Card specification) that may be operative to preside over firmware of secure element 145 may be operative to ensure or otherwise force the uniqueness of each AID on secure element 145 (e.g., each credential instance on secure element 145 may be associated with its own unique AID).

As shown in FIG. 2A, secure element 145 may include ISD 152, which may include an ISD key 156k that may also be known to a trusted service manager associated with that security domain (e.g., AE subsystem 400). ISD key 156k may be leveraged or otherwise used by AE subsystem 400 and device 100 similarly to and/or instead of access key 155a and/or access key 155b for enabling secure transmissions between AE subsystem 400 and secure element 145. Moreover, as shown in FIG. 2A, various data may be communicated between processor 102 and secure element 145. For example, processor 102 of device 100 may be configured to run a device application 103 that may communicate information with an application 113 of processor 102 as well as secure element 145, an I/O interface component 114a (e.g., for receiving I/O input data 115i and/or for transmitting I/O output data 115o), and/or communications component 106. Moreover, as shown, processor 102 may have access to device identification information 119, which may be utilized for enabling secure communication between device 100 and one or more remote entities.

As shown in FIG. 2A, secure element 145 may include a controlling authority security domain ("CASD") 158, which may be configured to generate and/or otherwise include CASD access kit 158k (e.g., CASD keys, certificates, and/or signing modules). For example, CASD 158 may be configured to sign certain data on secure element 145 (e.g., using CASD access kit 158k) before providing such data to another portion of device 100 (e.g., communications component 106 for sharing with other subsystems of system 1). Secure element 145 may include a contactless registry services ("CRS") applet or application 151 that may be configured to provide local functionality to electronic device 100 for modifying a life cycle state (e.g., activated, deactivated, suspended, locked, etc.) of certain security domain elements and sharing certain output information 115o about certain security domain elements in certain life cycle states with a user of device 100 (e.g., via a user I/O interface 114a), and may include a CRS list 151t that may maintain a list of the current life cycle state of each security domain element on secure element 145 and may be configured to share the life cycle state of one or more security domain elements with an application of device 100 (e.g., with any suitable application type, such as a daemon, such as card management daemon ("CMD") application 113a that may be running as a background process inside an operating system application 103 and/or a card management application 113b (e.g., a Passbook™ or Wallet™ application by Apple Inc.) and/or a device protection ("DP") application 113c (e.g., an application and/or daemon that may be associated with device protection subsystem 471 of AE subsystem 400) and/or an identity services ("IDS") application 113d, which in turn may provide certain life cycle state information to a user of device 100 as output information 115o via I/O interface 114a and a user interface ("UI") application (e.g., a UI of card management application 113b), which may enable a user to change a life cycle state of a security domain element. CRS 151 may include a CRS access key 151k that may also be known to a trusted service manager associated with CRS 151 (e.g., AE subsystem 400) and may be leveraged or otherwise used by AE subsystem 400 and device 100 similarly to and/or instead of access key 155a and/or access key 155b for enabling secure transmissions between AE subsystem 400 and secure element 145.

DP application 113c may be any suitable application type, such as a daemon, that may be running as a background process inside operating system application 103 and/or card management application 113b and/or that may be provided by CMD application 113a or that may be an application provided by any suitable entity (e.g., an entity responsible for device protection subsystem 471), and may be operative to enable any suitable device protection service(s) to be later activated by device protection subsystem 471 for protecting device 100 in one or more ways. For example, DP application 113c may be a "Find My Device" application (e.g., a "Find My iPhone" or "Find My Mac" application by Apple Inc.) that may be used in conjunction with a service of device protection subsystem 471 (e.g., an iCloud service of Apple Inc.) to track the location of device 100 and/or remotely control one or more functions of device 100, such as turn on an alarm and/or erase or suspend or otherwise terminate the usefulness of certain device content, such as suspend the ability for the secure element of device 100 to generate and/or communicate transaction credential data for use in furthering a transaction with a remote entity. Such a service may be useful to a device owner when device 100 may be lost or stolen such that the device may be recovered and/or such that sensitive data on the device may not be accessed. IDS application 113d may be any suitable application type, such as a daemon, that may be running as a background process inside operating system application 103 and/or card management application 113b and/or that may be provided by CMD application 113a, and may be operative as an IDS manager for listening for and responding to IDS messages that may be sent over any suitable IDS service (e.g., an IDS service of IDS subsystem 471 of AE subsystem 400) to and/or from device 100, which may be similar to any suitable messaging service, such as iMessage™ by Apple Inc., or the like (e.g., FaceTime™ or Continuity™ by Apple Inc.), and/or which may enable unique end-to-end encryption of messages between IDS application 113d of device 100 and a similar IDS application of another device (e.g., an IDS application 213d of device 200). Such messages may be encrypted using unique identifiers for one or both of the communicating devices (e.g., device unique identifier 119 of device 100 and/or a device unique identifier 219 of device 200) and/or for unique social tokens (e.g., telephone number, etc.) of one or both of the specific users of the communicating devices. Such messages may be communicated as a local link or a true device to device (e.g., peer to peer) communication, or may be communicated via AE subsystem 400 (e.g., via an IDS subsystem of AE subsystem 400 (e.g., using an identity management system component)). Such messaging may be enabled as a low latency solution that may allow data to be exchanged in structured formats (e.g., protocol buffers) and/or unstructured formats.

As shown in FIG. 3, a specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. For example, a touch screen I/O component 114a may include a display output component 112a and an associated touch input component 110f, where display output component 112a may be used to display a visual or graphic user interface ("GUI") 180, which may allow a user (e.g., first user U1) to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112a. For example, as shown in FIG. 3, GUI 180 may be configured to display a first screen 190 with one or more graphical elements or icons 182 of GUI 180. When a specific icon 182 is selected, device 100 may be configured to open a new application associated with that icon 182 and display a corresponding screen of GUI 180 associated with that application. For example, when the specific icon 182 labeled with a "Merchant App" textual indicator 181 (i.e., specific icon 183) is selected by a user of device 100, device 100 may launch or otherwise access a specific third party merchant or SP application and may display screens of a specific user interface that may include one or more tools or features for interacting with device 100 in a specific manner. As another example, when the specific icon 182 labeled with a "Messaging" textual indicator 181 (i.e., specific icon 184) is selected, device 100 may launch or otherwise access a specific device application (e.g., a messaging application), which may provide an administration-entity specific (or other entity specific) communication service (e.g., iMessage™ by Apple Inc.), where such a service may be operative to provide an end-to-end encrypted communication between device 100 and another device (e.g., second user device 200) (e.g., via an identity services ("IDS") subsystem of AE subsystem 400), and where such a service may require registration (e.g., active registration) by each device before device detection may be achieved and/or messages can be sent between the devices using the service (e.g., using an IDS application on each participating device (e.g., IDS application 113d of device 100)). Therefore, in some embodiments, certain communications between device 100 and device 200 may be facilitated by and through an IDS subsystem of AE subsystem 400 for enabling a secure and/or efficient communication path between devices. As another example, when the specific icon 182 labeled with a "Wallet" textual indicator 181 (i.e., specific icon 185) is selected, device 100 may launch or otherwise access a specific device application (e.g., card management application 113b of FIG. 2A (e.g., as a "Wallet" or "Passbook" application) for managing various credentials on secure element 145) and may display screens of a specific user interface that may include one or more tools or features for interacting with device 100 in a specific manner. As another example, when the specific icon 182 labeled with a "Protection" textual indicator 181 (i.e., specific icon 186) is selected, device 100 may launch or otherwise access a specific device application (e.g., device protection application 113c of FIG. 2A (e.g., a "Find My Device" application)) for enabling certain device protection services to be activated (e.g., by device protection subsystem 471) for protecting device 100 (e.g., if lost, stolen, etc.).

Figure 2B:
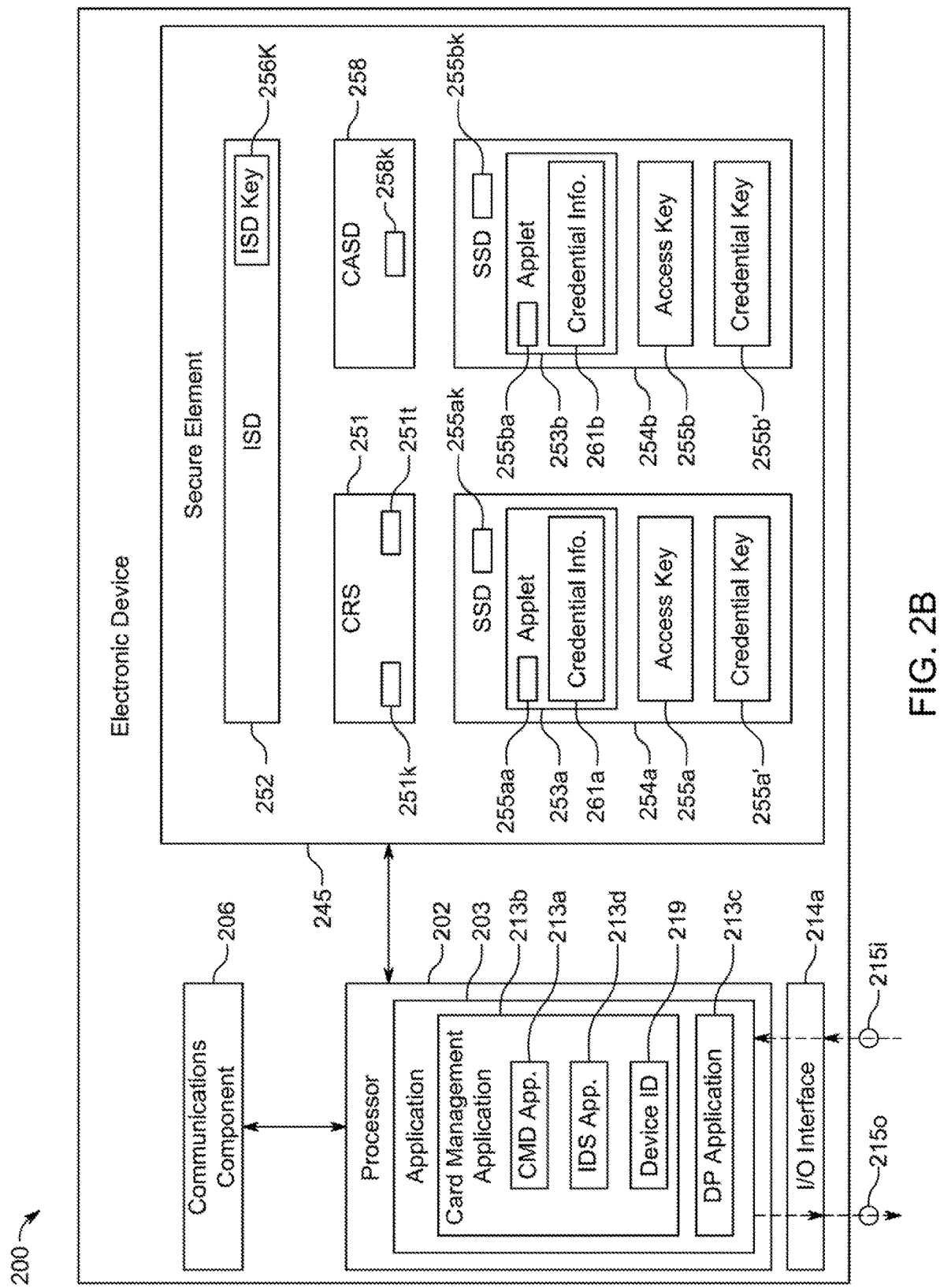
FIG. 2B is a more detailed schematic view of an example of an other one of the electronic devices of the system of FIG. 1.

While FIGS. 2, 2A, and 3 may be described with respect to first device 100, it is to be understood that one, some, or all of the components of device 100 of any one or more of FIGS. 2, 2A, and 3 may similarly be provided by second device 200. For example, as shown in FIG. 2B, second device 200 may include one, some, or each of the same elements as first device 100, where, unless otherwise noted, each element 2XX of device 200 of FIG. 2B may be similar to a respective element 1XX of device 100 of FIG. 2A. However, in some embodiments, one or more components of first device 100 may not be provided by second device 200 (e.g., second device 200 may not include a secure element with one or more credentials provisioned thereon, and yet second device 200 may still help facilitate a financial transaction using a transaction credential provisioned on first device 100 and a receiver user account). For example, it may be possible that second device 200 of second user U2 may not include a secure element or any send tokens, but still may be contacted by AE subsystem 400 to accept payment and/or select a receiver account, etc. (e.g., in an embodiment where AE subsystem 400 may automatically create a stored value account for each user (e.g., a stored value account that may be linked to a credit card on file with AE subsystem 400 (e.g., for iTunes or any suitable media store managed by AE subsystem 400 or the like) but that is not associated with a credential on any secure element or otherwise of second device 200 of second user U2)). For any applicable application, screens may be displayed on a display output component of a user electronic device (e.g., display output component 112a of device 100) and may include various user interface elements. For each application, various other types of non-visual information may be provided to a user via various other device output components (e.g., various other device output components 112 of device 100 other than display output component 112a). In some embodiments, one or each of devices 100 and 200 may not include a user interface component operative to provide a GUI but may instead be considered a more automated device. For example, one or each of devices 100 and 200 may not include a user interface component operative to provide a GUI but may include one or more user interface components operative to provide an audio and/or haptic output to a user and/or to provide mechanical or other suitable user input components for selecting and authenticating use of a payment credential for funding a transaction.

As mentioned, CI subsystem 300 may include at least one issuing subsystem (e.g., at least one issuing bank subsystem), such as first issuing subsystem 391 and second issuing subsystem 392. Additionally, in some embodiments, issuer subsystem 300 may include at least one network subsystem (e.g., at least one payment network subsystem (e.g., a payment card association or a credit card association)), such as a first network subsystem and a second network subsystem. For example, each issuing subsystem may be a financial institution that may assume primary liability for an associated user's capacity to pay off debts they may incur while using a specific payment card and its associated credential applets on a user device. One or more specific credential applets of device 100 may be associated with a specific payment card or funding card that may be electronically linked to a fund account or accounts of a particular user or group of users (e.g., a joint account of two or more family members) managed by a particular issuing subsystem of CI subsystem 300. Various types of payment cards may be suitable, including credit cards, debit cards, charge cards, stored-value cards or stored-value accounts, fleet cards, gift cards, and the like. The credential of a specific payment card may be provisioned on device 100 (e.g., as a transaction credential of a credential supplemental security domain ("SSD") of NFC component 120) by a particular issuing subsystem of issuer subsystem 300 (e.g., directly or via AE subsystem 400), and that provisioned credential may then be used by device 100 for generating transaction credential data (e.g., sender device payment credential data) that may be used as a portion of a transaction credential data communication that may be communicated from device 100 for initiating the funding of a receiver user fund account that may be managed by the same or another particular issuing subsystem of CI subsystem 300 (e.g., a receiver user fund account that may be associated with a credential of a specific payment card provisioned on second device 200), where such funding may be provided by a sender user fund account that may be associated with the provisioned credential on device 100 that generated the transaction credential data, which may be used to identify the receiver user fund account. Each credential may be a specific brand of payment card that may be branded by a network subsystem of issuer subsystem 300. Each network subsystem of issuer subsystem 300 may be a network of various issuing subsystems of issuer subsystem 300 and/or various acquiring banks that may process the use of payment cards (e.g., commerce credentials) of a specific brand. A network subsystem and an issuing subsystem of issuer subsystem 300 may be a single entity or separate entities. For example, American Express may be both a network subsystem and an issuing subsystem, while, in contrast, Visa and MasterCard may be payment subsystems and may work in cooperation with issuing subsystems, such as Citibank, Wells Fargo, Bank of America, and the like. Although not shown, CI subsystem 300 may also include or have access to a processor component, a communications component, an I/O interface, a bus, a memory component, and/or a power supply component that may be the same as or similar to such components of device 100, one, some or all of which may be at least partially provided by one, some, or each one of first issuing subsystem 391 and second issuing subsystem 392 of CI subsystem 300.

In order for at least a certain type of transaction to occur within system 1 (e.g., a transaction that may be carried out by system 1 between device 100 (e.g., a sender device) and a receiver user account managed by CI subsystem 300 (e.g., a receiver user account that may be associated with a credential of a specific payment card provisioned on second device 200) for funding that receiver user account using transaction credential data from a credential provisioned on device 100), at least one transaction credential should be securely provisioned on first (sender) device 100 (e.g., directly from issuer subsystem 300 or via AE subsystem 400 (e.g., via credential protection subsystem 491)) and/or at least one transaction credential should be securely provisioned on second (receiver) device 200 (e.g., directly from issuer subsystem 300 or via AE subsystem 400 (e.g., via credential protection subsystem 491)). For example, first user credential data (e.g., data 516d of FIG. 5) may be provisioned from CI subsystem 300 (e.g., from first issuing subsystem 391) onto secure element 145 of device 100 for first user U1 as at least a portion or all of a credential supplemental security domain of NFC component 120 (e.g., SSD 154a) and may include a credential applet with credential information and/or a credential key, such as payment application or credential applet 153a with credential information 161a and credential key 155a'. Additionally, in some embodiments, second user credential data (e.g., data 532d of FIG. 5) may be provisioned from CI subsystem 300 (e.g., from second issuing subsystem 392) onto secure element 245 of device 200 for second user U2 as at least a portion or all of a credential supplemental security domain of that secure element (e.g., SSD 254a) and may include a credential applet with credential information and/or a credential key, such as payment application or credential applet 253a with credential information 261a and credential key 255a'. Issuer subsystem 300 (e.g., first issuing subsystem 391) may also have access to credential key 155a' (e.g., for decrypting data encrypted by device 100 using credential key 155a'), and issuer subsystem 300 (e.g., second issuing subsystem 392) may also have access to credential key 255a' (e.g., for decrypting data encrypted by device 200 using credential key 255a'). Issuer subsystem 300 may be responsible for management of credentials key 155a' and 255a', which may include the generation, exchange, storage, use, and replacement of such keys. Issuer subsystem 300 may store its version of each credential key in one or more appropriate secure elements of issuer subsystem 300. It is to be understood that each one of credential keys 155a' and 155b' of device 100 and of issuer subsystem 300 may be any suitable shared secret (e.g., a password, passphrase, array of randomly chosen bytes, one or more symmetric keys, respective public-private keys (e.g., asymmetric keys), etc.) available to both or a respective one of the secure element of electronic device 100 and issuer subsystem 300 that may be operative to enable any suitable crypto data (e.g., a cryptogram) or any other suitable data to be independently generated by electronic device 100 and issuer subsystem 300 (e.g., for validating payment data for a financial transaction), such as by using any suitable cryptographic algorithm or cipher whose functional output may be at least partially determined by the shared secret, where such a shared secret may be provisioned on device 100 by issuer subsystem 300, and/or to allow secure encryption and decryption of data communicated between device 100 and subsystem 300. A shared secret may either be shared beforehand between issuer subsystem 300 and device 100 (e.g., during provisioning of a credential on device 100 by issuer subsystem 300), in which case such a shared secret may be referred to as a pre-shared key, or a shared secret may be created prior to use for a particular financial transaction by using a key-agreement protocol (e.g., using public-key cryptography, such as Diffie-Hellman, or using symmetric-key cryptography, such as Kerberos). The shared secret and any suitable cryptographic algorithm or cipher whose functional output may be at least partially determined by the shared secret may be accessible to the secure element of device 100. Similarly, it is to be understood that each one of credential keys 255a' and 255b' of device 200 and of issuer subsystem 300 may be any suitable shared secret available to both the secure element of electronic device 200 and issuer subsystem 300.

AE subsystem 400 (e.g., credential protection subsystem 491) may be provided as an intermediary between issuer subsystem 300 and one or both of device 100 and device 200, where AE subsystem 400 may be configured to provide a new layer of security and/or to provide a more seamless user experience when a credential is being provisioned on device 100 or on device 200, and/or when such a provisioned credential is being used as part of a transaction credential data communication from device 100 or device 200 for funding a receiver user account at issuer subsystem 300. AE subsystem 400 may be provided by any suitable administration and/or commercial entity that may offer various services to a user of a user device (e.g., device 100 and/or device 200) via user-specific log-in information to a user-specific account with that administration entity (e.g., via user-specific identification and password combinations). As just one example, AE subsystem 400 may be provided by Apple Inc. of Cupertino, Calif., which may also be a provider of various administration and/or other services to users of device 100 and/or of device 200 (e.g., the iTunes™ Store for selling/renting media to be played by one or each device, the Apple App Store™ for selling/renting applications for use on device 100 (e.g., store 420 for securely delivering applications to one or each device), the Apple iCloud™ Service (e.g., a service of device protection subsystem 471) for storing data from one or each device and/or associating a user with a device and/or providing device protection services (e.g., using DP application 113c on device 100), the Apple Online Store for buying various Apple products online, the Apple iMessage™ Service for communicating media messages between devices, the Apple Pay™ Service (e.g., a service of credential protection subsystem 491) for securing and managing credential provisioning on one or each device and/or securely using transaction credential data from a device for furthering a transaction with a receiver user account, etc.), and which may also be a provider, manufacturer, and/or developer of device 100 itself and/or device 200 itself (e.g., when device 100 and/or device 200 is an iPod™ iPad™, iPhone™, MacBook™, iMac™, Apple Watch™, or the like) and/or of an operating system of one or each device (e.g., device application 103 of device 100 and/or device application 203 of device 200) and/or of any other application of one or each device (e.g., one or more of applications 113a-113d of device 100 and/or one or more of applications 213a-213d of device 200). The administration or commercial entity that may provide AE subsystem 400 (e.g., Apple Inc.) may be distinct and independent from any credential issuing and/or financial entity of issuer subsystem 300. For example, the administration or commercial entity that may provide AE subsystem 400 may be distinct and/or independent from any payment network subsystem or issuing bank subsystem that may furnish and/or manage any user account associated with any payment card or with any transaction credential to be provisioned on user device 100 and/or on user device 200. The entity that may provide AE subsystem 400 (e.g., Apple Inc.) may be distinct and independent from any merchant or SP subsystem (e.g., any SP entity that may provide an SP terminal for NFC communications, a third party application for online communications, and/or any other aspect of an SP subsystem). Such an administration entity may leverage or otherwise use its potential ability to configure or control various components of device 100 and/or of device 200 (e.g., software and/or hardware components of a device, such as when that entity may at least partially produce or manage device 100 and/or device 200) in order to provide a more seamless user experience for a user of device 100 when he or she wants to provision a credential offered by issuer subsystem 300 on device 100 and/or when such a provisioned credential is being used as part of a transaction credential data communication from device 100 for funding a receiver user account that may be associated with a credential provisioned by issuer subsystem 300 on device 200 and/or when device 100 may have any device protection services enabled (e.g., via DP application 113c) for facilitating any suitable device protection services by device protection subsystem 471. For example, in some embodiments, device 100 may be configured to communicate with AE subsystem 400 seamlessly and transparently to a user of device 100 for sharing and/or receiving certain data that may enable a higher level of security (e.g., during an online-based transaction credential data communication between device 100 and issuer subsystem 300 and/or when device 100 has been reported as lost or stolen). Although not shown, AE subsystem 400 may also include or have access to a processor component, a communications component, an I/O interface, a bus, a memory component, and/or a power supply component that may be the same as or similar to such components of device 100, one, some or all of which may be at least partially provided by one, some, or each one of device protection subsystem 471 and credential protection subsystem 491 and transaction protection subsystem 481 of AE subsystem 400.

In addition to at least one transaction credential being provisioned on first device 100 (e.g., a first user credential as a portion of a first credential SSD 154a with credential key 155a' and credential information 161a), at least one access SSD 154c with an access key 155c may also be provisioned on device 100 in order to more securely enable device 100 to conduct a financial or other secure transaction with a remote entity using that provisioned credential. For example, access data may be provisioned on device 100 as at least a portion of access SSD 154c directly from AE subsystem 400 and may include an access applet 153c with access key 155c. AE subsystem 400 (e.g., credential protection subsystem 491) may also have access to access key 155c (e.g., for decrypting data encrypted by device 100 using access key 155c). AE subsystem 400 may be responsible for management of access key 155c, which may include the generation, exchange, storage, use, and replacement of such a key. AE subsystem 400 may store its version of access key 155c in a secure element of AE subsystem 400. Access SSD 154c with access key 155c may be configured to determine intent and local authentication of a user of device 100 (e.g., via one or more input components 110 of device 100, such as a biometric input component) and, in response to such a determination, may be configured to enable another particular SSD for conducting a payment transaction (e.g., with a user credential of credential SSD 154a or SSD 154b). By storing such an access SSD within secure element 145 of device 100, its ability to reliably determine user intent for and authentication of a secure data transaction may be increased. Moreover, access key 155c may be used to provide increased encryption to any transaction credential data that may be communicated outside of the secure element of device 100. Access data may include issuer security domain ("ISD") key 156k for ISD 152 of secure element 145, which may also be maintained by AE subsystem 400, and may be used in addition to or as an alternative to access key 155c (or one or more other ones of access keys 155a, 155b, 151k, and 158k of device 100). Similarly, in addition to at least one transaction credential being provisioned on second device 200 (e.g., a second user credential as a portion of a first credential SSD 254a with credential key 255a' and credential information 261a), at least one access SSD 254c with an access key 255c may also be provisioned on device 200 in order to more securely enable device 200 to conduct a financial or other secure transaction with a remote entity using that provisioned credential. For example, access data may be provisioned on device 200 as at least a portion of access SSD 254c directly from AE subsystem 400 and may include an access applet 253c with access key 255c. AE subsystem 400 (e.g., credential protection subsystem 491) may also have access to access key 255c (e.g., for decrypting data encrypted by device 200 using access key 255c). AE subsystem 400 may be responsible for management of access key 255c, which may include the generation, exchange, storage, use, and replacement of such a key. AE subsystem 400 may store its version of access key 255c in a secure element of AE subsystem 400. Access SSD 254c with access key 255c may be configured to determine intent and local authentication of a user of device 200 (e.g., via one or more input components of device 200, such as a biometric input component) and, in response to such a determination, may be configured to enable another particular SSD for conducting a payment transaction (e.g., with a user credential of credential SSD 254a or SSD 254b). By storing such an access SSD within secure element 245 of device 200, its ability to reliably determine user intent for and authentication of a secure data transaction may be increased. Moreover, access key 255c may be used to provide increased encryption to any transaction credential data that may be communicated outside of the secure element of device 200. Access data may include issuer security domain ("ISD") key 256k for ISD 252 of secure element 245, which may also be maintained by AE subsystem 400, and may be used in addition to or as an alternative to access key 255c (or one or more other ones of access keys 255a, 255b, 251k, and 258k of device 200). It is to be understood that each one of any shared key(s) between AR subsystem 400 and either one of device 100 or device 200 may be any suitable shared secret (e.g., a password, passphrase, array of randomly chosen bytes, one or more symmetric keys, respective public-private keys (e.g., asymmetric keys), etc.) available to both or a respective one of the secure element of an electronic device and AE subsystem 400 that may be operative to enable any suitable crypto data (e.g., a cryptogram) or any other suitable data to be independently generated by the electronic device and AE subsystem 400 for any suitable security purpose.

Figure 4:
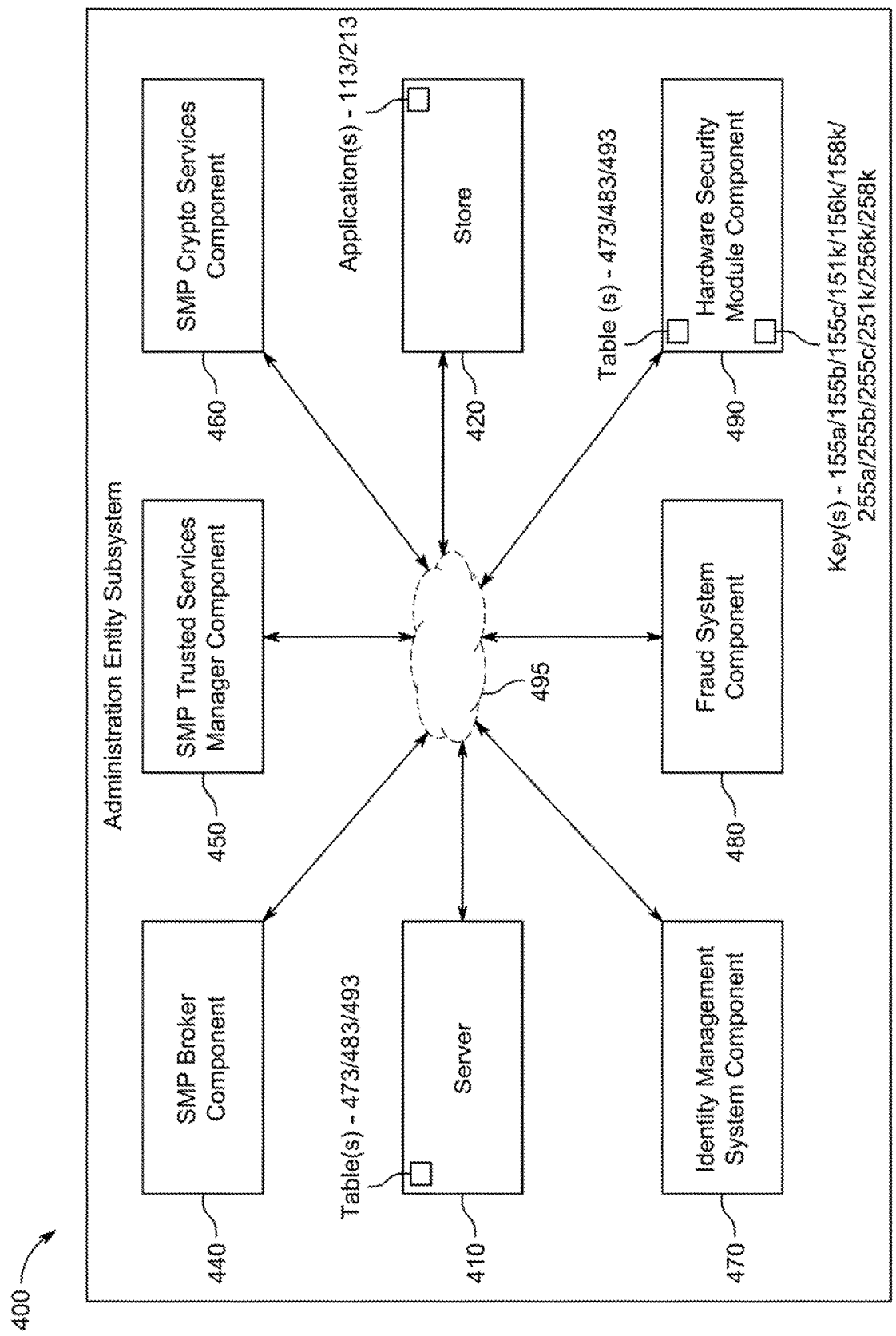
FIG. 4 is a more detailed schematic view of an example administration entity subsystem of the system of FIG. 1.

Description of FIG. 4

FIG. 4 shows further details with respect to various embodiments of AE subsystem 400 of system 1. As shown in FIG. 4, AE subsystem 400 may be a secure platform system and may include a server 410, an online store 420, secure mobile platform ("SMP") broker component 440, an SMP trusted services manager ("TSM") component 450, an SMP crypto services component 460, an identity management system ("IDMS") component 470, a fraud system component 480, and/or a hardware security module ("HSM") component 490. In some embodiments, one or more components of AE subsystem 400 may be combined or omitted. Moreover, AE subsystem 400 may include other components not combined or included in FIG. 4. For example, AE subsystem 400 may include any other suitable components or several instances of the components shown in FIG. 4. For the sake of simplicity, only one of each of the components is shown in FIG. 4. One, some, or all components of AE subsystem 400 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of AE subsystem 400 may be managed by, owned by, at least partially controlled by, and/or otherwise provided by a single administration or commercial entity (e.g., Apple Inc.) that may be distinct and independent from issuer subsystem 300. The components of AE subsystem 400 may interact with each other and collectively with issuer subsystem 300 and/or electronic device 100 and/or electronic device 200 for providing a new layer of security and/or for providing a more seamless user experience. In some embodiments, one, some, or each of device protection subsystem 471, credential protection subsystem 491, and transaction protection subsystem 481 may include its own processing component, memory component, communications component, store 420, SMP broker component 440, SMP TSM component 450, SMP crypto services component 460, IDMS component 470, fraud system component 480, and/or HSM component 490. For example, each one of device protection subsystem 471, credential protection subsystem 491, and transaction protection subsystem 481 may be a discreet subsystem with its own processing components, its own storage components (e.g., its own secure element(s)), and its own communication components.

SMP broker component 440 of AE subsystem 400 may be configured to manage user authentication with an administration or commercial entity user account. SMP broker component 440 may also be configured to manage the lifecycle and provisioning of credentials on device 100 and/or on device 200. SMP broker component 440 may be a primary end point that may control the user interface elements (e.g., elements of GUI 180) on device 100 and/or on device 200. An operating system or other application of an end user device (e.g., application 103, application(s) 113, and/or application 143 of device 100, and/or application 203, application(s) 213, and/or an NFC application of device 200) may be configured to call specific application programming interfaces ("APIs") and SMP broker 440 may be configured to process requests of those APIs and respond with data that may derive the user interface of device 100 and/or of device 200 and/or respond with application protocol data units ("APDUs") that may communicate with secure element 145 of device 100 and/or with secure element 245 of device 200. Such APDUs may be received by AE subsystem 400 from issuer subsystem 300 via a TSM of system 1 (e.g., a TSM of a communication path between AE subsystem 400 and issuer subsystem 300). SMP TSM component 450 of AE subsystem 400 may be configured to provide GlobalPlatform-based services or any other suitable services that may be used to carry out credential provisioning operations on device 100 and/or on device 200 from issuer subsystem 300. GlobalPlatform, or any other suitable secure channel protocol, may enable SMP TSM component 450 to properly communicate and/or provision sensitive account data between secure element 145 of device 100 (or secure element 245 of device 200) and a TSM for secure data communication between AE subsystem 400 and issuer subsystem 300.

SMP TSM component 450 may be configured to use HSM component 490 to protect its keys and generate new keys (e.g., keys 151$k$, 155$a$-155$c$, 156$k$, 158$k$, 251$k$, 255$a$-255$c$, 256$k$, 258$k$, etc.). SMP crypto services component 460 of AE subsystem 400 may be configured to provide key management and cryptography operations that may be provided for user authentication and/or confidential data transmission between various components of system 1. SMP crypto services component 460 may utilize HSM component 490 for secure key storage and/or opaque cryptographic operations. A payment crypto service of SMP crypto services component 460 may be configured to interact with IDMS component 470 to retrieve information associated with on-file credit cards or other types of commerce credentials associated with user accounts of the administration entity. IDMS component 470 or any other suitable component or subsystem of AE subsystem 400 (e.g., an identity services ("IDS") subsystem) may be configured to enable and/or manage any suitable device detection and/or communication between device 100 and one or more other devices (e.g., second user electronic device 200), such as an identity services ("IDS") transport (e.g., using an administration-entity specific (or other entity specific) service (e.g., iMessage™ by Apple Inc.)). For example, certain devices may be automatically or manually registered for such a service (e.g., all user devices in an eco-system of AE subsystem 400 may be automatically registered for the service), for example, using a unique social token of the device (e.g., a telephone number associated with the device). Such a service may provide an end-to-end encrypted mechanism that may require active registration before device detection may be achieved and/or before messages can be sent using the service (e.g., using an IDS application on each participating device (e.g., IDS applications 113$d$ and 213$d$), such as a messaging application of icon 184 labeled with "Messaging" textual indicator 181 of screen 190 of GUI 180 of device 100 of FIG. 3). Such an IDS component or subsystem and/or any other suitable server or portion of AE subsystem 400 may be operative to identify or otherwise lookup the status of any credentials provisioned on any electronic devices associated with a given user account or otherwise, such that AE subsystem 400 may be operative to efficiently and effectively identify one or more payment credentials that may be available to a particular device associated with a particular user account (e.g., multiple host devices of a family account with AE subsystem 400). Fraud system component 480 of AE subsystem 400 may be configured to run an administration entity fraud check on a transaction credential based on data known to the administration entity about the transaction credential and/or the sender user and/or the sender user device and/or the receiver user and/or an associated sender user device (e.g., based on data (e.g., transaction credential information) associated with a user account with the administration entity and/or any other suitable data that may be under the control of the administration entity and/or any other suitable data that may not be under the control of issuer subsystem 300). Fraud system component 480 may be configured to determine an administration entity fraud score for the credential based on various factors or thresholds. AE subsystem 400 may include store 420, which may be a provider of various services to users of device 100 and/or of device 200 (e.g., the iTunes™ Store for selling/renting media to be played by a device, the Apple App Store™ for selling/renting applications for use on a device, etc.). As just one example, store 420 may be configured to manage and provide an application 113 to device 100, where application 113 may be any suitable application, such as a banking application, an SP application, an e-mail application, a text messaging application, an internet application, a card management application, a device protection application, or any other suitable communication application. Server 410 may be used to store and/or process any suitable data. For example, a server of device protection subsystem 471 may access and process any suitable data of any suitable table or directory or data structure 473, while a server of credential protection subsystem 491 may access and process any suitable data of any suitable table or directory or data structure 493, and/or while a server of transaction protection subsystem 481 may access and process any suitable data of any suitable table or directory or data structure 483. Any suitable communication protocol or combination of communication protocols may be used by a communications set-up 495 of AE subsystem 400 to communicate data amongst the various components of AE subsystem 400 and/or to communicate data between AE subsystem 400 and other components of system 1 (e.g., issuer subsystem 300 and/or device 100 and/or device 200 (e.g., via communications set-up 9)).

Figure 5:
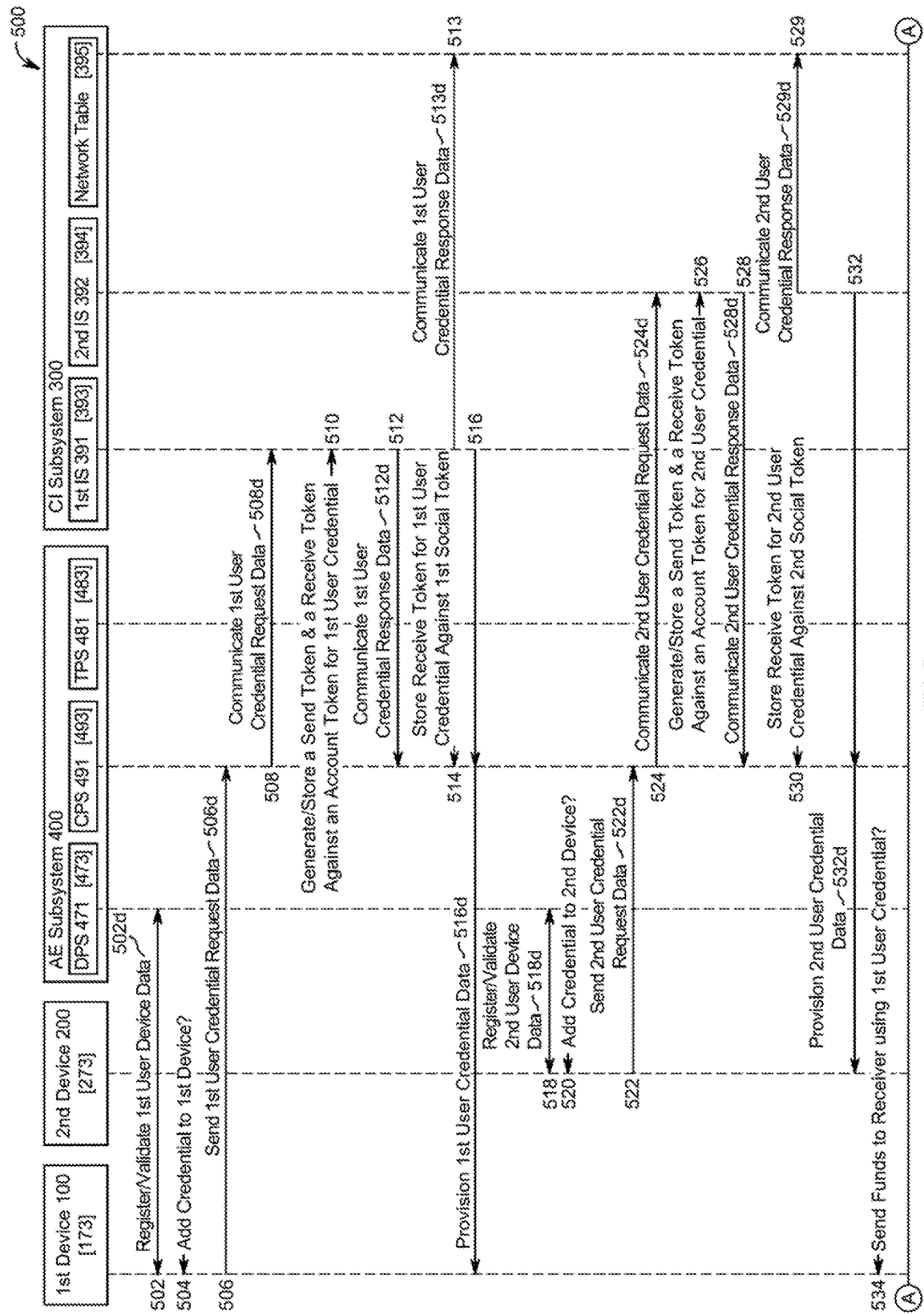
FIG. 5 is a flowchart of an illustrative process for facilitating a fund transfer.
Figure 5:
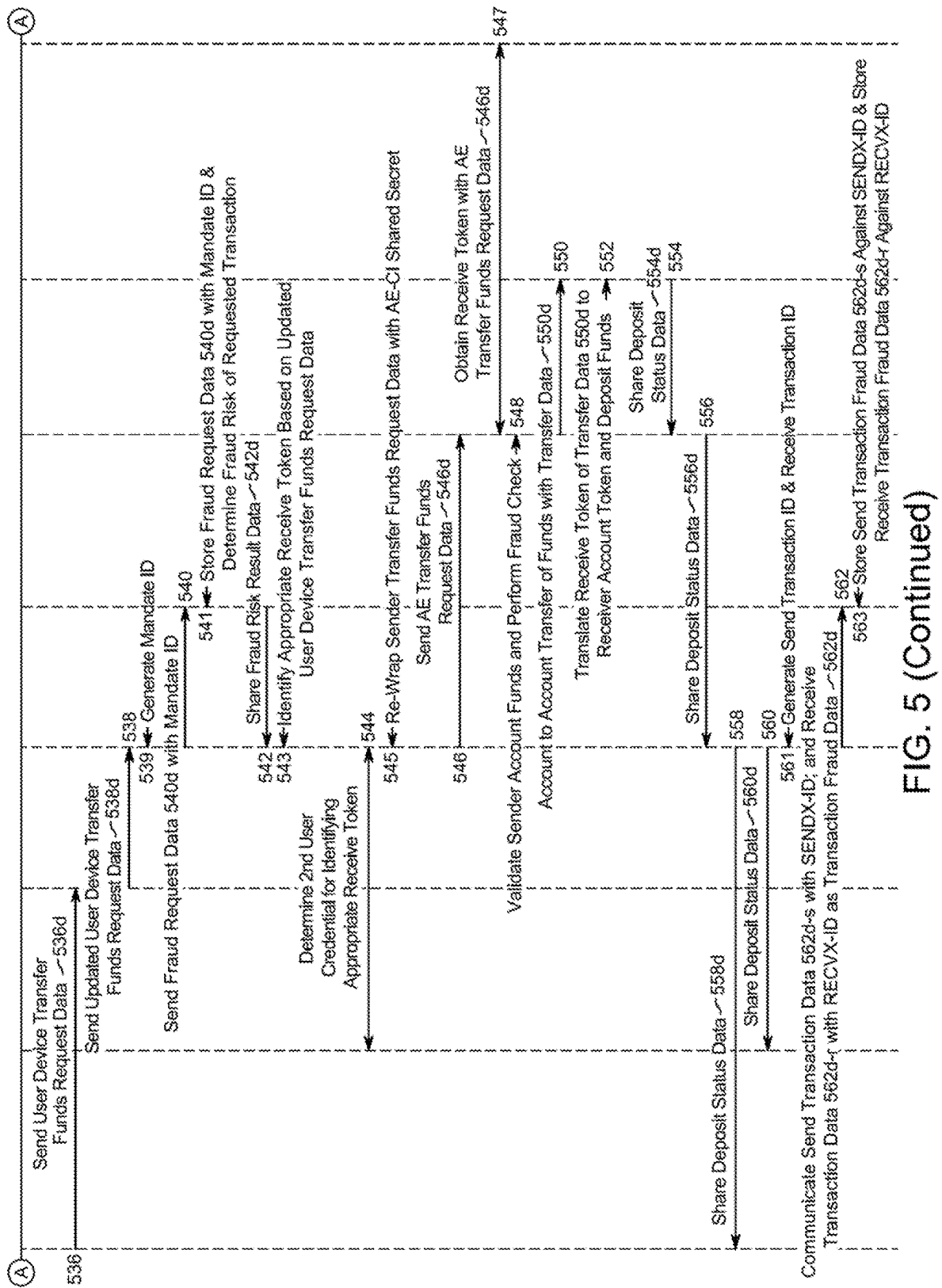

Description of FIG. 5

FIG. 5 is a flowchart of an illustrative process 500 for facilitating a fund transfer between user accounts. Process 500 is shown being implemented by first device 100 (e.g., U1's and/or a sender's device 100 with storage 173 (e.g., memory 104 and/or secure element 145)), second device 200 (e.g., U2's and/or a receiver's device 200 with storage 273 (e.g., a memory 204 and/or secure element 245)), CI subsystem 300 (e.g., first issuing subsystem ("1$^{st}$ IS") 391 with a directory or table or data structure 393, second issuing subsystem ("2$^{nd}$ IS") 392 with a directory or table or data structure 394, and a network directory or table or data structure 395), and AE subsystem 400 (e.g., device protection subsystem ("DPS") 471 with DPS table 473, transaction protection subsystem ("TPS") 481 with TPS table 483, and credential protection subsystem ("CPS") 491 with CPS table 493). However, it is to be understood that process 500 may be implemented using any other suitable components or subsystems. Process 500 may provide a seamless user experience for securely and efficiently facilitating the transfer of funds between a sender fund account associated with sender device 100 and a receiver fund account associated with a social identifier using device protection subsystem 471 and credential protection subsystem 491 of AE subsystem 400 while limiting the potential for privacy and/or security breaches by preventing AE subsystem 400 from storing information at AE subsystem 400 that may specifically link two or more particular users or accounts to a particular transfer. To facilitate the following discussion regarding the operation of system 1 for facilitating a fund transfer between user accounts according to process 500 of FIG. 5, reference is made to various components of system 1 of the schematic diagrams of FIGS. 1, 2, 2A, 2B, and 4, and to the content of various system tables or directories or data structures of FIGS. 4A-4H. The operations described may be achieved with a wide variety of graphical elements and visual schemes. Therefore, the embodiments described are not intended to be limited to particular user interface conventions adopted herein. Rather, embodiments may include a wide variety of user interface styles, including at least partially or totally non-visual user interface styles for user devices.

At operation 502 of process 500, any suitable first user device data 502d may be exchanged between device 100 and AE subsystem 400 (e.g., device protection subsystem 471 (as shown) and/or credential protection subsystem 491) for initializing, registering, and/or validating device 100 with AE subsystem 400 in any suitable manner. As mentioned, AE subsystem 400 may be provided by any suitable administration and/or commercial entity that may offer various services to a user of any user device (e.g., user U1 of device 100 and/or user U2 of device 200), such as via user-specific log-in information to a user-specific account with that administration entity (e.g., via user-specific identification and password combinations). Therefore, at operation 502, device 100 may be associated with a particular account of user U1 at AE subsystem 400 in any suitable manner. For example, user U1 of device 100 may log into its account at AE subsystem 400 (e.g., using an online resource on device 100), where user U1 may enter a first user identifier U1-ID that may be any suitable data that may uniquely identify first user U1 to AE subsystem 400 and/or any suitable first user password data U1-PW associated therewith (e.g., user-specific log-in information to a user-specific account with that administration entity (e.g., via a user-specific identification and password combination or the like)), and provide that user account data to AE subsystem 400 along with any suitable device registration identifier(s) or any suitable device registration data, such as a unique electronic device identifier ED1-ID of device 100 (e.g., any unique identifier assigned to device 100 (e.g., by AE subsystem 400), such as at time of device manufacture) and/or at least one social identifier or social token LT-1 (e.g., at least one telephone number and/or e-mail address) associated with device 100 for user 1 (e.g., any suitable device identification information 119), such that the device registration data of device 100 may be associated with user U1's verified specific user account at AE subsystem 400 (e.g., at device protection subsystem 471). For example, as shown in FIG. 4A, storage 173 of device 100 may include first user identifier U1-ID and unique electronic device identifier ED1-ID and social token LT-1 (e.g. in a portion or entry 173a of storage 173), and, as shown in FIG. 4C, DPS table 473 of device protection subsystem 471 may be updated at operation 502 by storing unique electronic device identifier ED1-ID and/or social token LT-1 of device 100 against the verified user account data of user U1 (e.g., first user identifier U1-ID and/or first user password data U1-PW), for example, by linking such data with any suitable data link(s) in a first linked data entry 473a of DPS table 473. It is to be understood that, when any first data is described as being stored against any second data, such first data may be stored in association with such second data, such that there may be a relationship between the two instances of data (e.g., such that one can be resolved against the other and/or such that one can be identified using the other). AE subsystem 400 may be operative to validate any or all of the device registration data of device 100 (e.g., unique electronic device identifier ED1-ID and/or social token LT-1) in any suitable manner prior to linking that device registration data with a verified user account at device protection subsystem 471.

In some embodiments of process 500, in addition to storing device registration data of device 100 against a verified user account of AE subsystem 400 (e.g., at device protection subsystem 471), access data may be provisioned on secure element 145 of device 100 (e.g., at operation 502) by AE subsystem 400 (e.g., by credential protection subsystem 491) in order to more securely enable device 100 to conduct a fund transfer. Such access data may be provisioned on secure element 145 of device 100 as at least a portion or all of access SSD 154c and may include access applet 153c and/or access key 155c, ISD key 156k for ISD 152 and/or CRS 151k of CRS 151 and/or CASD 158k of CASD 158 and/or access key 155a for SSD 154a and/or access key 155b for SSD 155b for enabling secure transmissions between AE subsystem 400 and device 100 (e.g., for use as any suitable commercial entity key or shared secret between AE subsystem 400 and host device 100). In some implementations, such access data may be carried out when device 100 is initially configured (e.g., by AE subsystem 400 before device 100 is sold to a user (e.g., user U1)). Alternatively, such access data may be at least partially carried out in response to a user of device 100 initially setting up secure element 145 of NFC component 120.

At operation 504, device 100 may prompt or otherwise enable a user (e.g., via any suitable user interface) to add a payment credential to secure element 145. Such a prompt may be provided in any suitable manner (e.g., via any suitable user interface of device 100) at any suitable time based on any suitable event. For example, when user U1 launches card management application 113b (e.g., a "Wallet" or "Passbook" application), that application may provide prompt data to the user that may be operative to ask the user if it would like to provision a new credential onto device 100. Alternatively or additionally, when a new application (e.g., a new operating system application (e.g., application 103)) is loaded onto device 100, that application may be operative to prompt the user to enroll in a new fund transfer feature of that application, which may require or suggest adding at least one credential to device 100 or otherwise associating a credential with device 100 (e.g., with a social token of device 100). As yet another example, if a fund transfer request is initiated by another device (e.g., device 200) that is indicative of an attempt to transfer funds to a receiver identified by a social token that is associated with device 100 (e.g., social token LT-1), then AE subsystem 400 may instruct device 100 to prompt a user of device 100 to associate a credential with device 100 and/or at least with that social token in order to facilitate the attempted transfer of funds (e.g., as described in more detail with respect to adding a credential to device 200 (e.g., at operation 543)).

At operation 506, first user credential request data 506d may be generated at device 100 and sent to AE subsystem 400 (e.g., to credential protection subsystem 491), where such first user credential request data 506d may be operative to request that one or more first user credentials be provisioned on device 100 for first user U1. For example, operation 506 may be at least partially carried out when first user U1 of device 100 selects a particular first user credential of CI subsystem 300 (e.g., of first issuing subsystem 391) to be provisioned on device 100 (e.g., by interacting with device 100 in any suitable manner). First user credential request data 506d may include any suitable identification of the first user credential to be provisioned (e.g., at least a portion of a primary account number ("PAN"), PAN expiry date, CVV, etc. of an associated physical or otherwise existing credential (e.g., physical credit card, etc.) and/or acceptance for a new type of default credential to be added according to a new fund transfer feature enabled by AE subsystem 400 (e.g., a new stored value credential to be created for device 100)), a first user identifier U1-ID that may be any suitable data that may uniquely identify first user U1 to AE subsystem 400, unique electronic device identifier ED1-ID of device 100, and/or the like.

At operation 508, first user credential request data 506d may be received by and processed by AE subsystem 400 (e.g., credential protection subsystem 491) in order to generate and send first user credential request data 508d to an appropriate issuing subsystem of credential issuer subsystem 300 for furthering the process of provisioning the requested credential onto device 100. In some embodiments, first user credential request data 508d may include any suitable data in addition to any data in first user credential request data 506d that may identify the credential to be provisioned. For example, credential protection subsystem 491 may be operative to determine (e.g., generate and/or obtain (e.g., from credential issuer subsystem 300 or from device 100)) a unique user credential identifier (e.g., unique user credential identifier PID-1a) that may uniquely identify to AE subsystem 400 the user credential being provisioned on device 100 but that alone may not enable a holder of that unique user credential identifier to utilize the user credential for funding a transaction. Such a unique user credential identifier may be any suitable data element of any suitable size, such as an 8- or 9-character alphanumeric string that may be randomly or uniquely generated by AE subsystem 400 or otherwise (e.g., by device 100 or by CI subsystem 300) for association with any suitable data indicative of first user U1 (e.g., first user identifier U1-ID) and/or any suitable data indicative of device 100 (e.g., unique electronic device identifier ED1-ID) that may be associated with the new credential provisioning request of user credential request data 506d. For example, as shown in FIG. 4D, CPS table 493 of credential protection subsystem 491 may be updated at operation 508 by storing first user identifier U1-ID with or without unique electronic device identifier ED1-ID against the unique user credential identifier PID-1a of the credential being requested for provisioning on device 100, for example, by linking such data with any suitable data link(s) in a first linked data entry 493a of CPS table 493. In some embodiments, a verified social token associated with device 100 (e.g., LT-1) may be stored by CPS 491 against the unique user credential identifier PID-1a of the credential being requested for provisioning on device 100 and/or against first user identifier U1-ID with or without unique electronic device identifier ED1-ID (e.g., in first linked data entry 493a of CPS table 493 at operation 508). In such embodiments, the verified social token may be included in user credential request data 506d, or CPS 491 may independently acquire the verified social token from DPS 471 (e.g., from table 473 using U1-ID and/or ED1-ID of data 506d). Alternatively, such a verified social token may only be stored by DPS 471 of AE subsystem 400 (e.g., in data entry 473a of DPS table 473 at operation 502). First user credential request data 508d that may be communicated from AE subsystem 400 to CI subsystem 300 may include any suitable data from AE subsystem 400 indicative of first device 100, such as U1-ID, ED1-ID, and/or LT-1 (e.g., the verified social token associated with device 100 on which the new credential is to be provisioned). Verified social token (e.g., LT-1) may or may not be stored by CPS 491 (e.g., in data entry 473a). Alternatively, first user credential request data 508d that may be communicated from AE subsystem 400 (e.g., CPS 491) to CI subsystem 300 may not include the verified social token associated with device 100 (e.g., LT-1) on which the new credential is to be provisioned. In such embodiments, such a verified social token (e.g., LT-1) may or may not be obtained and stored by CI subsystem 300 (e.g., in entry 393a of table 393 and/or in entry 395a of network table 395) through any suitable technique independent of CPS 491 (e.g., by directly communicating with device 100 or user 1 of device 100 (e.g., as may be identified by any suitable information of first user credential request data 508d (e.g., PID-1a, and/or the like) and/or any other information already accessible to CI subsystem 30 (e.g., due to associating a funding account with the user (e.g., the account associated with a PAN identified by data 506d)))). At operation 508, AE subsystem 400 may determine the target issuing subsystem of CI subsystem 300 that is to receive first user credential request data 508d (e.g., based on any suitable target issuing subsystem information of first user credential request data 506d received from device 100 and/or based on any other suitable information utilized by AE subsystem 400, such as where AE subsystem 400 may select an appropriate target issuing subsystem of CI subsystem 300 that AE subsystem 400 may choose to utilize for generating a fund account on behalf of a user of device 100 (e.g., a new stored-value account to be created for the user)), and then that target issuing subsystem of CI subsystem 300 may be sent the first user credential request data 508d.

At operation 510, first user credential request data 508d may be received by and processed by CI subsystem 300 (e.g., by target issuing subsystem 391) in order to provision the requested user credential on device 100 while also associating the user credential with a particular funding account of CI subsystem 300 and while also sharing unique information indicative of the funding account with AE subsystem 400. For example, first user credential request data 508d communicated from AE subsystem 400 to CI subsystem 300 may be operative to instruct CI subsystem 300 (e.g., an appropriate issuing subsystem) (i) to identify an existing fund account or establish a new fund account with a unique account token ("AT") that is to be associated with the user credential to be provisioned on device 100, (ii) to obtain a unique send token ("ST") that may be provisioned on device 100 and associated with the account and its unique account token at CI subsystem 300, and (iii) to obtain a unique receive token ("RT") that may be shared with AE subsystem 400 and associated with the account and its unique account token at CI subsystem 300. A send token ST may be any suitable data element of any suitable size that may be randomly or uniquely generated or otherwise obtained by CI subsystem 300 for association with an account token AT of a fund account. For example, a send token ST may be or may include a DPAN (e.g., a 16-19 character token, which may be similar to a credit/debit card number that may be compatible with various card networks) and/or a device account reference ("DAR") (e.g., a well-defined formatted string, which may contain a globally unique identifier ("GUID") or a universally unique identifier ("UUID") (e.g., a 128-bit integer number that may be used to identify one or more resources) and/or a code (e.g., a bank code) that may identify a particular source (e.g., a particular issuing subsystem)). The send token may be used to identify and authenticate a sender (e.g., credential data from a credential provisioned on a sender user device) at a sender issuing subsystem of CI subsystem 300 for initiating the transfer of funds from a sender fund account to another fund account, where the send token may be a device specific token that may uniquely identify a sender device to fund account relationship. A receive token RT may be any suitable data element of any suitable size that may be randomly or uniquely generated or otherwise obtained by CI subsystem 300 for association with an account token AT of a fund account. For example, a receive token RT may be or may include a receiver primary account number ("RPAN") (e.g., a 16-19 character token, which may be similar to a credit/debit card number that may be compatible with various card networks) and/or a DAR, where the receive token information itself may be user-anonymous and/or account-anonymous such that the receive token may not on its own identify a particular user or a particular fund account. The receive token may be generated at the time of provisioning an associated send token onto a sender device.

First user credential request data 508d may be operative to enable first issuing subsystem 391 to identify an existing funding account maintained by issuing subsystem 391 (e.g., a funding account associated with a credit card credential identified by user U1 at operation 506) or to generate a new funding account (e.g., a new stored value account or otherwise), where that funding account may be operative to store and/or transmit and/or receive funds and that may be at least partially defined by any suitable unique account token AT-1a (e.g., any suitable funding primary account number ("F-PAN")). At operation 510, a unique send token ST-1a and a unique receive token RT-1a may be generated and/or obtained by CI subsystem 300 for association with account token AT-1a of the funding account associated with the user credential being requested for provisioning on device 100, yet where each one of unique receive token RT-1a and unique send token ST-1a may not be associated with another account token of subsystem 391. For example, as shown in FIG. 4F, CI table 393 of first issuing subsystem 391 may be updated at operation 510 by storing unique send token ST-1a and unique receive token RT-1a against unique account token AT-1a, for example, by linking such data with any suitable data link(s) in a first linked data entry 393a of CI table 393. In some embodiments, any suitable information from first user credential request data 508d may also be stored against AT-1a, ST-1a, and/or RT-1a at operation 510, such as unique user credential identifier PID-1a of the credential being requested for provisioning on device 100, first user identifier unique electronic device identifier ED1-ID, and/or any suitable social token(s) that may be associated with an owner or verified user of a credential associated with the funding account identified by account token AT-1a (e.g., social token LT-1 of device 100 as may be provided by AE subsystem 400 (e.g., in data 508d) and/or any social token that may be verified by CI subsystem 300 independent of AE subsystem 400), for example, by linking such data with any suitable data link(s) in first linked data entry 393a of CI table 393. In some embodiments, rather than being generated by AE subsystem 400 and shared with CI subsystem 300 (e.g., at operation 508), unique user credential identifier PID-1a of the credential being requested for provisioning on device 100 may be generated by CI subsystem 300 (e.g., at operation 510) and then shared with AE subsystem 400 (e.g., as a portion of data 512d at operation 512).

At operation 512, first user credential response data 512d may be sent to AE subsystem 400 (e.g., credential protection subsystem 491) from CI subsystem 300 (e.g., first issuing subsystem 391), where first user credential response data 512d may include at least unique receive token RT-1a, in order to share unique information linked to the funding account with AE subsystem 400. Receive token RT-1a may be unique to AE subsystem 400 and may be stored by AE subsystem 400 against any suitable other data for later use by AE subsystem 400 in facilitating a secure and efficient transfer of funds between user accounts (e.g., receive token RT-1a of data 512d may be stored at AE subsystem 400 in such a way that AE subsystem 400 may be operative to identify receive token RT-1a using a particular social token LT-1 that is also associated with user device 100 involved in the credential request (e.g., receive token RT-1a of data 512d may be stored directly against social token LT-1 in any suitable table of AE subsystem 400, and/or receive token RT-1a may be stored directly against any suitable first user device data associated with user device 100 (e.g., first user identifier U1-ID and/or unique electronic device identifier ED1-ID and/or user credential identifier PID-1a) in a first table of AE subsystem 400 (e.g., in entry 493a of table 493 of CPS 491) and social token LT-1 may be stored directly against that same first user device data (e.g., first user identifier U1-ID and/or unique electronic device identifier ED1-ID and/or user credential identifier PID-1a) in a second table of AE subsystem 400 (e.g., in entry 473a of table 473 of DPS 471) in order for such first user device data to then be used by AE subsystem 400 to identify receive token RT-1a for social token LT-1 (e.g., at operations 538 and 543). For example, at operation 514, AE subsystem 400 (e.g., credential protection subsystem 491) may store receive token RT-1a against unique user credential identifier PID-1a of the credential being provisioned on device 100 and/or against first user identifier U1-ID and/or against unique electronic device identifier ED1-ID of device 100. As mentioned, in some embodiments, unique user credential identifier PID-1a may be generated by CI subsystem 300 and may be included as a portion of first user credential response data 512d communicated to AE subsystem 400 at operation 512. For example, as shown in FIG. 4D, CPS table 493 of credential protection subsystem 491 may be updated at operation 514 by storing receive token RT-1a of first user credential response data 512d against unique user credential identifier PID-1a of the credential being provisioned on device 100 and first user identifier U1-ID with or without unique electronic device identifier ED1-ID, for example, by linking such data with any suitable data link(s) in first linked data entry 493a of CPS table 493. Therefore, CPS table 493 may include a link (e.g., in first linked data entry 493a) between information indicative of a verified user of device 100 (i.e., first user identifier U1-ID) and unique information (i.e., receive token RT-1a) linked to but not independently indicative of a funding account at CI subsystem 300 (i.e., account token AT-1a) that is also associated with a user credential (e.g., send token ST-1a) being provisioned on device 100 and other unique information associated with but not independently indicative of that receive token (i.e., unique user credential identifier PID-1a), where this link may be later utilized by process 500 (e.g., at one or more of operations 543, 544, 545, and 546) to securely and efficiently facilitate the transfer of funds from one user account to another user account.

Additionally or alternatively to operation 512, alternative first user credential response data 513d may be sent to a network table 395 (e.g., a table of CI subsystem 300 or otherwise in system 1) from first issuing subsystem 391 at operation 513, where alternative first user credential response data 513d may include at least unique receive token RT-1a, in order to share unique information indicative of the funding account with network table 395. Receive token RT-1a may be unique to network table 395 and may be stored at network table 395 against any suitable other data for later use by network table 395 in facilitating a secure and efficient transfer of funds between user accounts. For example, at operation 513, network table 395 (e.g., a portion of CI subsystem 300 that may be distinct from each issuing subsystem of CI subsystem 300 or that may be a portion of a particular issuing subsystem of CI subsystem 300 or any other suitable subsystem (not shown) of system 1) may store receive token RT-1a against one or more social tokens associated with the funding account of account token AT-1a (e.g., as verified by issuing subsystem 391), such as social token LT-1 and against a unique issuing subsystem identifier BID-1 that may uniquely identify first issuing subsystem 391 (e.g., the source of receive token RT-1a) at network table 395. For example, as shown in FIG. 4H, network table 395 may be updated at operation 513 by storing receive token RT-1a of alternative first user credential response data 513d against unique issuing subsystem identifier BID-1 of first issuing subsystem 391 and at least one social token LT-1 provided by first issuing subsystem 391 and/or associated PID-1a, for example, by linking such data with any suitable data link(s) in a first linked data entry 395a of network table 395. Therefore, network table 395 may include a link (e.g., in first linked data entry 395a) between information indicative of a verified social token of device 100 (i.e., social token LT-1) and unique information (i.e., receive token RT-1a) that is linked to but not independently indicative of a funding account at CI subsystem 300 (i.e., account token AT-1a) that is also linked to a user credential being provisioned on device 100 (i.e., send token ST-1a) and other unique information indicative of the source issuing subsystem for that funding account (i.e., unique issuing subsystem identifier BID-1 of first issuing subsystem 391), where this link may be later utilized by process 500 (e.g., at operation 547) to securely and efficiently facilitate the transfer of funds from one user account to another user account. The network directory of network table 395 may enable convenient transfers of funds between customers of the same or different financial institutions and payment service providers using any suitable social tokens (e.g., e-mail addresses, mobile telephone numbers, etc.). An issuing subsystem may register one or more social tokens of a user with a particular account token of a particular fund account of that issuing subsystem and may be used as profile identification in the network directory.

At operation 516, first user credential data 516d may be provisioned on device 100 by first issuing subsystem 391 of CI subsystem 300, in some embodiments, via AE subsystem 400 (e.g., via CPS 491). For example, such first user credential data 516d may be at least partially provisioned on secure element 145 of device 100 directly from first issuing subsystem 391. Such first user credential data 516d may be at least partially provisioned on secure element 145 as at least a portion or all of first credential SSD 154a and may include credential applet 153a with credential information 161a and/or credential key 155a' and/or key 155ak. In some embodiments, first user credential data 516d may also include access key 155a, which may be initially provided from AE subsystem 400 to issuer subsystem 300 and/or may be added by AE subsystem 400. Such first user credential data 516d may include send token ST-1a (e.g., a unique identifier associated with the account token AT-1a (e.g., F-PAN) of the funding account at CI subsystem 300 and that may be used specifically for provisioning a payment credential on a particular user device) as at least a portion of credential information of the payment credential being provisioned (e.g., credential information 161a of applet 153a), an AID (e.g., AID 155aa for applet 153a of the data of the payment credential being provisioned at SSD 154a), an SSD identifier, and/or an SSD counter. Moreover, in some embodiments, such first user credential data 516d may include other unique information associated with but not indicative of a receive token associated with that send token ST-1a (i.e., unique user credential identifier PID-1a), which may be initially provided from device 100 to AE subsystem 400 (e.g., at operation 506) and/or initially provided from AE subsystem 400 to issuer subsystem 300 (e.g., at operation 508) and/or may be added by AE subsystem 400 (e.g., at operation 516). For example, as shown in FIG. 4A, storage 173 of device 100 may be updated to include send token ST-1a linked with or otherwise stored against unique user credential identifier PID-1a (e.g. in a portion or entry 173b of storage 173, which may span secure element 145 and memory 104 of device 100), where this link may be later utilized by process 500 (e.g., at operation 544, as described with respect to a similar entry 273a of storage 273 of device 200) to securely and efficiently facilitate the transfer of funds from one user account to another user account. It is to be appreciated that send token ST-1a may be considered or otherwise referred to herein as a "virtual" credential or virtual PAN or device PAN ("D-PAN") or send device PAN ("SD-PAN") that may be provisioned on device 100 rather than the user's "actual" credential or actual PAN or funding PAN ("F-PAN") (e.g., account token AT-1a). For example, once it is determined that a credential is to be provisioned on device 100, it may be requested (e.g., by issuer subsystem 300, by AE subsystem 400, and/or by a user of device 100) that a virtual credential be generated, linked to the actual credential, and provisioned on device 100 instead of the actual credential for later use in a funding transaction. Similarly, it is to be appreciated that receive token RT-1a may be considered or otherwise referred to herein as a "virtual" credential or virtual PAN or receive PAN ("R-PAN") that may be shared by CI subsystem 300 with AE subsystem 400 and/or with network table 395 rather than the user's "actual" credential or actual PAN or funding PAN ("F-PAN") (e.g., account token AT-1a). For example, once it is determined that a credential is to be provisioned on device 100, it may be requested (e.g., by issuer subsystem 300, by AE subsystem 400, and/or by a user of device 100) that a virtual receive credential be generated, linked to the actual credential, and shared with AE subsystem 400 and/or table 395 instead of the actual credential for later use in a funding transaction. Such creation and linking of one or more virtual credentials with an actual credential may be performed by any suitable component of issuer subsystem 300. For example, a network subsystem of issuer subsystem 300 (e.g., a particular payment network subsystem that may be associated with the brand of the actual credential) may define and store the link in table 393 that may create associations between the actual credential and at least one virtual credential, such that anytime a virtual credential (e.g., a send token and/or a receive token) is utilized for funding a transaction, the payment network subsystem may receive an authorization or validation request or otherwise attempt to validate any received data indicative of that virtual credential (e.g., at one or more of operations 548-552) and may conduct an analysis of that validation attempt request in light of the actual credential associated with the virtual credential as determined by table 393. Alternatively, such a table may be accessible and/or similarly leveraged or otherwise used by an appropriate issuing subsystem (e.g., issuing subsystem 391 or 392) or any other suitable subsystem accessible by CI subsystem 300. By provisioning a virtual credential on device 100 and/or on AE subsystem 400 rather than an actual credential, CI subsystem 300 may be configured to limit the fraudulent activity that may result when the virtual credential is intercepted by an unauthorized user, as a payment network subsystem or issuing subsystem may only be configured to utilize table 393 for linking the virtual credential to the actual credential during certain transactions, such as when the virtual credential is received by CI subsystem 300 from AE subsystem 400.

One or more additional credentials may be similarly provisioned on device 100 (e.g., via AE subsystem 400) from first issuing subsystem 391 and/or from second issuing subsystem 392. While operations 504-516 may be described with respect to provisioning a first payment credential on SSD 154a of device 100 from first issuing subsystem 391 (e.g., via AE subsystem 400) that may include various ones of AT-1a, ST-1a, RT-1a, PID-1a, U1-ID, ED1-ID, LT-1, BID-1, and/or the like being generated and/or stored in one or more of entry 173b of storage 173, entry 493a of table 493, entry 393a of table 393, and entry 395a of table 395, it is to be understood that two or more payment credentials may be provisioned on device 100. For example, although not shown in FIG. 5, process 500 may include at least one additional iteration of operations similar to operations 504-516 that may provision at least one additional payment credential on device 100. As just one particular example, a second credential may be provisioned on SSD 154b of device 100 from first issuing subsystem 391 (e.g., via AE subsystem 400) that may include various ones of AT-1b, ST-1b, RT-1b, PID-1b, U1-ID, ED1-ID, LT-1, BID-1, and/or the like being generated and/or stored in one or more of entry 173c of storage 173, entry 493b of table 493, entry 393b of table 393, and entry 395b of table 395, where second account token AT-1b may be used similarly to but have a different value than first account token AT-1a, second send token ST-1b may be used similarly to but have a different value than first send token ST-1a, second receive token RT-1b may be used similarly to but have a different value than first receive token RT-1a, and second unique user credential identifier PID-1b may be used similarly to but have a different value than first unique user credential identifier PID-1a.

One or more credentials may be similarly provisioned on device 200 (e.g., via AE subsystem 400) from first issuing subsystem 391 and/or from second issuing subsystem 392. While operations 502-516 may be described with respect registering first user U1 and device 100 with AE subsystem 400 and then provisioning a first payment credential on SSD 154a of device 100 from first issuing subsystem 391 (e.g., via AE subsystem 400) that may include various ones of AT-1a, ST-1a, RT-1a, PID-1a, U1-ID, U1-PW, ED1-ID, LT-1, BID-1, and/or the like being generated and/or stored in one or more of entries 173a and 173b of storage 173, entry 473a of table 473, entry 493a of table 493, entry 393a of table 393, and entry 395a of table 395, it is to be understood that second user U2 and device 200 may be registered with AE subsystem 400 and one or more payment credentials may be similarly provisioned on device 200. For example, as shown by operations 518-532 that may be similar to operations 502-516, device 200 and user U2 may be registered with AE subsystem 400 (e.g., using U2-ID, U2-PW, ED2-ID, and/or LT-2) and a payment credential may be provisioned on SSD 254a of device 200 from second issuing subsystem 392 (e.g., via AE subsystem 400) that may include various ones of data 518d, 522d, 524d, 528d, 529d, and/or 532d being generated and communicated as well as various ones of AT-2a, ST-2a, RT-2a, PID-2a, U2-ID, U2-PW, ED2-ID, LT-2, BID-2, and/or the like being generated and/or stored in one or more of entries 273a and 273b of storage 273 of device 200, entry 473b of table 473, entry 493c of table 493, entry 394a of table 394 of second issuing subsystem 392, and entry 395c of table 395, where second user identifier U2-ID of user U2 may be used similarly to but have a different value than first user identifier U1-ID of user U1, second user password data U2-PW of user U2 may be used similarly to but have a different value than first user password data U1-PW of user U1, second unique electronic device identifier ED2-ID of device 200 may be used similarly to but have a different value than first unique electronic device identifier ED1-ID of device 100, and second social token LT-2 of device 200 may be used similarly to but have a different value than first social token LT-1 of device 100.

One or more additional credentials may be similarly provisioned on device 200 (e.g., via AE subsystem 400) from first issuing subsystem 391 and/or from second issuing subsystem 392. While operations 520-532 may be described with respect to provisioning a first payment credential on SSD 254a of device 200 from second issuing subsystem 392 (e.g., via AE subsystem 400) that may include various ones of AT-2a, ST-2a, RT-2a, PID-2a, U2-ID, ED2-ID, LT-2, BID-2, and/or the like being generated and/or stored in one or more of entry 273b of storage 273, entry 493c of table 493, entry 394a of table 394, and entry 395c of table 395, it is to be understood that two or more payment credentials may be provisioned on device 200. For example, although not shown in FIG. 5, process 500 may include at least one additional iteration of operations similar to operations 520-532 that may provision at least one additional payment credential on device 200. As just one particular example, another credential may be provisioned on device 200 at SSD 254b from first issuing subsystem 391 (e.g., via AE subsystem 400) that may include various ones of AT-2b, ST-2b, RT-2b, PID-2b, U2-ID, ED2-ID, LT-2, BID-1, and/or the like being generated and/or stored in one or more of entry 273c of storage 273, entry 493d of table 493, entry 393c of table 393, and entry 395d of table 395, where account token AT-2b may be used similarly to but have a different value than account token AT-2a, send token ST-2b may be used similarly to but have a different value than send token ST-2a, receive token RT-2b may be used similarly to but have a different value than receive token RT-2a, and unique user credential identifier PID-2b may be used similarly to but have a different value than unique user credential identifier PID-2a.

Therefore, each user device of system 1 registered with AE subsystem 400 may have a payment credential including a unique send token provisioned on the user device by an issuing subsystem of CI subsystem 300. Each send token may be linked to a funding account (e.g., a unique funding account) associated with a unique account token and a unique receive token at CI subsystem 300. A send token provisioned on a sending device may be used by that device to identify the uniquely linked funding account at CI subsystem 300 that is to be used for funding a transfer to another funding account. The receive token for each funding account may be linked at AE subsystem 400 to one or more social tokens of one or more user devices registered at AE subsystem 400. When a social token is identified at AE subsystem 400 for use in an account to account transfer, AE subsystem 400 may identify an appropriate receive token linked to that social token and may then share that receive token with CI subsystem 300 such that CI subsystem 300 may use that receive token to identify the uniquely linked funding account at CI subsystem 300 that is to be used for receiving funds in the account to account transfer.

A fund transfer may be initiated by a user of a user device selecting a payment credential provisioned on the user device, choosing an amount of funds to be transferred from the funding account associated with that selected payment credential, and identifying a social token of a receiver that may be associated with another funding account for receiving the transfer of funds. For example, at operation 534 of process 500, first or sender device 100 may prompt or otherwise enable user U1 (e.g., via any suitable user interface) to select a payment credential provisioned on device 100 (e.g., one of a first payment credential provisioned on SSD 154a that may include send token ST-1a (e.g., in entry 173b of storage 173 of device 100) that may be linked to account token AT-1a of a particular account at first issuing subsystem 391 (e.g., in table entry 393a of table 393 of subsystem 391) and a second payment credential provisioned on SSD 154b that may include send token ST-1b (e.g., in entry 173c of storage 173 of device 100) that may be linked to account token AT-1b of another particular account at first issuing subsystem 391 (e.g., in table entry 393b of table 393 of subsystem 391)) as well as to choose an amount of funds to be transferred from the account associated with the selected payment credential as well as to identify a social token of a receiver that may be associated with another account for receiving the funds to be transferred. Such a prompt may be provided in any suitable manner (e.g., via any suitable user interface of device 100) at any suitable time based on any suitable event or at the user's discretion. For example, when user U1 launches card management application 113b (e.g., a "Wallet" or "Passbook" application (e.g., when the "Wallet" application indicated by specific icon 185 of FIG. 3 is selected)), that application may provide prompt data to the user that may be operative to ask the user if it would like to use a provisioned credential to transfer funds to a particular user, where, for example, along with selecting a particular provisioned payment credential (e.g., send token ST-1a or send token ST-1b), the user may enter or otherwise select a particular amount of funds (e.g., 50 U.S. Dollars) and the user may enter or otherwise select (e.g., from a drop down list or UI from a contacts application or other suitable data source available to device 100) at least particular social token or receiver identifier associated with a particular social token. Alternatively or additionally, when user U1 is using an IDS application 113d on device 100 (e.g., a "Messaging" or other suitable communication application (e.g., after the "Messaging" application indicated by specific icon 184 of FIG. 3)) for communicating from device 100 to a particular other user identified by a particular social token (e.g., a particular telephone number or e-mail address or the like) that may be used by the messaging application to target the other user (e.g., receiver user) (e.g., via IDS application 213d on device 200 associated with social token LT-2), that messaging application of device 100 may provide prompt data to the user (e.g., sender user) that may be operative to ask the user if it would like to use a provisioned credential to transfer funds to the particular user (e.g., receiver user) currently being communicated with via that messaging application, where, for example, along with identifying that it would like to send funds to an account associated with the social token to which the messaging application is currently targeting, the user may enter or otherwise select a particular amount of funds (e.g., 50 U.S. Dollars) and the user may select (e.g., from a drop down list or UI from a Wallet application or other suitable data source available to device 100) a particular provisioned payment credential of device 100 to be used in funding the fund transfer (e.g., send token ST-1a or send token ST-1b). Alternatively, or additionally, the particulars of a funds transfer to be initiated by device 100 may be identified in any other suitable manner via any suitable user interface scenario, such as in an e-mail or any other suitable communications medium.

In one particular example of process 500, which may be used throughout a majority of the description of the remaining operations of process 500, a fund transfer of $50 may be initiated at device 100 to occur between the fund account identified by account token AT-1a at first issuing subsystem 391 (see, e.g., entry 393a of table 393 of FIG. 4F) and the fund account identified by account token AT-2a at second issuing subsystem 392 (see, e.g., entry 394a of table 394 of FIG. 4G). For example, user U1 of device 100 (e.g., at operation 534) may identify an amount of $50 that ought to be transferred from a sender funding account associated with an identified first payment credential provisioned on SSD 154a of sender device 100 (e.g., the payment credential which was provisioned on device 100 including send token ST-1a (see, e.g., entry 173b of storage 173 of device 100 of FIG. 4A)) to a receiver account associated with an identified social token LT-2 (e.g., a telephone number that may be associated with a contact known to user U1 and that may be registered to user 2 and device 200 at AE subsystem 400 (see, e.g., entry 273a of storage 273 of FIG. 4B and/or entry 473b of table 473 of FIG. 4C)).

Once a payment credential provisioned on device 100 has been identified for use in funding a fund transfer along with an amount of funds to be transferred and along with any suitable receiver information operative to identify a social token associated with an account for use in receiving the funds to be transferred at operation 534, any suitable first user device transfer funds request data 536d may be generated and transmitted from device 100 (e.g., to AE subsystem 400) at operation 536 for carrying out the transfer. Continuing with the particular example mentioned above for transferring $50 from the fund account identified by account token AT-1a at first issuing subsystem 391 (see, e.g., entry 393a of table 393 of FIG. 4F) and the fund account identified by account token AT-2a at second issuing subsystem 392 (see, e.g., entry 394a of table 394 of FIG. 4G) due to user U1 of device 100 identifying an amount of $50 to be transferred from a sender funding account associated with the payment credential provisioned on SSD 154a of sender device 100 including send token ST-1a to a receiver account associated with an identified social token LT-2, particular first user device transfer funds request data 536d may be generated at and transmitted from device 100 indicative of such a transfer request. That is, for example, device transfer funds request data 536d may include any suitable fund amount data indicative of the selected $50 value, any suitable receiver identification data indicative of the selected social token LT-2, and any suitable sender device payment credential data indicative of the selected provisioned payment credential on device 100 including send token ST-1a of SSD 154a. For example, such sender device payment credential data of device transfer funds request data 536d generated by device 100 may include any suitable data that may be operative to securely prove proper ownership of the particular secure element credential of device 100 (e.g., the credential of SSD 154a of secure element 145 of device 100) and necessary to make a payment with that credential, including, but not limited to, (i) token data (e.g., send token ST-1a (e.g., a virtual DPAN) with or without any other suitable data of SSD 154a, such as a PAN expiry date, a card security code (e.g., a card verification code ("CVV")), and/or name and/or address associated with the credential of credential information 161a of SSD 154a) and (ii) crypto data (e.g., a cryptogram that may be generated by secure element 145 of SSD 154a using a shared secret of SSD 154a and issuer subsystem 300 (e.g., credential key 155a' of first issuer subsystem 391) and any other suitable information (e.g., some or all of the token data, information identifying device 100 (e.g., ED1-ID), information identifying the selected amount of the transfer (e.g., $50), any suitable counter values, nonce, etc.) that may be available to device 100 and that may also be made available to issuer subsystem 300 for independently generating the crypto data using the shared secret (e.g., to validate the sender device payment credential data from device 100 (e.g., at operation 548))).

If user U1 is willing and able to select or confirm a particular payment credential of device 100 for use in funding the potential transaction, operation 536 may receive intent and authentication by user U1 of device 100 to utilize the selected payment credential through any suitable user interaction with device 100. Access SSD 154c may leverage or otherwise use applet 153c of device 100 to determine whether such authentication has occurred before allowing other SSDs 154 (e.g., credential SSD 154a) to be used for enabling its credential information in device transfer funds request data communication. As just one example, applet 153c of access SSD 154c may be configured to determine intent and local authentication of a user of device 100 (e.g., via one or more input components 110, such as a biometric input component 110i of FIG. 3, as may be used by a user interacting with any application of device 100 (e.g., card management application 113b of device 100)) and, in response to such a determination, may be configured to enable another particular SSD for conducting a payment transaction (e.g., with the payment credential of credential SSD 154a). Next, once intent and authentication has been received for a particular payment credential, operation 536 may include device 100 generating, encrypting, and transmitting device transfer funds request data 536d for use by AE subsystem 400. Once the particular payment credential SSD 154a on secure element 145 of device 100 has been selected, authenticated, and/or enabled for use in a transaction, secure element 145 of device 100 (e.g., processor module 142 of NFC component 120) may generate and encrypt certain credential data of that selected payment credential for use by AE subsystem 400. For example, as mentioned, sender device payment credential data of device transfer funds request data 536d may be generated by selected SSD 154a to include any suitable token data indicative of send token ST-1a and crypto data, which may be generated and/or at least partially encrypted with credential key 155a', such that such encrypted sender device payment credential data may only be decrypted by an entity with access to that credential key 155a' (e.g., first issuing subsystem 391 of issuer subsystem 300) for accessing the sender device payment credential data. In some embodiments, once some or all of that sender device payment credential data of credential SSD 154a has been encrypted with credential key 155a' as CI-encrypted sender device payment credential data at operation 536, that CI-encrypted sender device payment credential data, either alone or along with any additional appropriate transfer data (e.g., any suitable fund amount data indicative of the selected $50 value, any suitable receiver identification data indicative of the selected social token LT-2, any suitable sender device data indicative of ED1-ID and/or U1-ID, any suitable mandate key (e.g., any suitable hash of any suitable unique identifier of device 100 (e.g., a device transfer unique identifier FX1-ID) and selected social token LT-2) that may provide a unique key for the particular combination of sender device 100 and receiver social token LT-2 of the current transaction, etc.), may be encrypted by access information (e.g., by access key 155a of SSD 154a, access key 155c of access SSD 154c, ISD key 156k, and/or CRS 151k and/or signed by CASD 158k) at operation 536 as AE-encrypted sender device payment credential data. For example, secure element 145 of device 100 (e.g., processor module 142 of NFC component 120) may use access information to encrypt not only an identification of the $50 amount of funds to be transferred and of the receiver social token LT-2 and/or of ED1-ID and/or U1-ID and/or of a mandate key of the transfer, but also the CI-encrypted sender device payment credential data of SSD 154a, into AE-encrypted sender device payment credential data. Any appropriate sender device payment credential data (e.g., token and crypto data) of selected SSD 154a (e.g., CI-encrypted sender device payment credential data (e.g., encrypted by credential key 155a') whether or not then encrypted as AE-encrypted sender device payment credential data (e.g., as encrypted by an access key)) may then be communicated along with any additional information, such as an identification of the $50 amount of funds to be transferred and/or identification of the receiver social token LT-2 and/or of ED1-ID and/or U1-ID and/or of a mandate key of the transfer, as device transfer funds request data 536d from device 100 to AE subsystem 400 at operation 536.

Therefore, at least a portion of device transfer funds request data 536d (e.g., AE-encrypted sender device payment credential data) may only be decrypted by an entity with access to that access information used for the AE encryption (e.g., access key 155a, access key 155c, ISD key 156k, CRS 151k, and/or CASD 158k) that generated any AE-encrypted sender device payment credential data of device transfer funds request data 536d (e.g., AE subsystem 400) and/or at least portions of device transfer funds request data 536d (e.g., CI-encrypted sender device payment credential data) may only be decrypted by an entity with access to that credential key information used for the CI encryption (e.g., credential key 155a') that generated any CI-encrypted sender device payment credential data of device transfer funds request data 536d (e.g., CI subsystem 300). Such device transfer funds request data 536d may be generated at operation 536 and then transmitted to AE subsystem 400 to ensure that any such device transfer funds request data 536d has first been encrypted in such a way that it cannot be decrypted by another portion of device 100 (e.g., by processor 102). That is, at least sender device payment credential data of device transfer funds request data 536d may be encrypted as CI-encrypted sender device payment credential data with a credential key 155a' that may not be exposed to or accessible by any portion of device 100 outside of its secure element. Moreover, at least a portion of device transfer funds request data 536d may be encrypted as AE-encrypted data with an access key (e.g., access key 155b, 155c, 156k, 151k, and/or 158k (e.g., referred to herein as "access information")) that may not be exposed to or accessible by any portion of device 100 outside of its secure element. In some embodiments, a transfer may be initiated by a potential receiver sending a request for funds to a sender device (e.g., via text message, e-mail, etc.), and the social token of the receiver that sent the request and/or a funding amount identified in the receiver's request may be automatically used to define a portion of any device transfer funds request data 536d that may be sent in response to the request. In some embodiments, as mentioned, device transfer funds request data 536d may be at least partially defined by or communicated using a messaging application with which the user of device 100 may be interacting. At least a portion of such device transfer funds request data 536d may include any suitable messaging data (e.g., character or emoji or picture data) selected by the user for communication as a part of a message being communicated to the receiver device along with the funds.

Device transfer funds request data 536d may be received and processed by device protection subsystem 471 so as to generate and transmit updated device transfer funds request data 538d at operation 538 to credential protection subsystem 491. Such an operation 538 may include device protection subsystem 471 identifying the selected receiver social token from device transfer funds request data 536d and using the identified receiver social token to identify a receiver user identifier associated with that identified receiver social token (e.g., to identify receiver social token LT-2 from device transfer funds request data 536d and then to identify receiver user identifier U2-ID as associated with (e.g., stored against) that receiver social token LT-2 at device protection subsystem 471 (e.g., in entry 473b of table 473 of FIG. 4C)). The identified receiver social token of device transfer funds request data 536d may be replaced with the identified receiver user identifier when updating device transfer funds request data 536d to updated device transfer funds request data 538d, such that the receiver social token of device transfer funds request data 536d may not be received by credential protection subsystem 491 (e.g., such that a receive token may not be linked to a receiver social token at credential protection subsystem 491 but instead a receive token may be linked to a receiver user identifier of AE subsystem 400 at credential protection subsystem 491 that may not on its own be revealing of the identity of the receiver user as might be a receiver social token (e.g., to prevent any particular subsystem of AE subsystem 400 from linking information indicative of a particular user to information indicative of a particular funding account)). In some embodiments, at least a portion of device transfer funds request data 536d (e.g., at least a portion of any portion of data 536d encrypted by any access information at device 100) may be decrypted using appropriate access information available to device protection subsystem 471 at operation 538 prior to communicating updated device transfer funds request data 538d to credential protection subsystem 491. Additionally or alternatively, in some embodiments, at least a portion of updated device transfer funds request data 538d (e.g., at least a portion of any portion of data 536d encrypted by any access information at device 100) may be decrypted using appropriate access information available to credential protection subsystem 491 at operation 538 upon receipt of updated device transfer funds request data 538d. Any such encryption of at least a portion of device transfer funds request data 536d with access information at device 100 before communication to AE subsystem 400 (e.g., access key 155a of SSD 154a, access key 155c of access SSD 154c, ISD key 156k, CRS 151k, and/or CASD 158k) at operation 536 as AE-encrypted sender device payment credential data, followed by any such decryption of such information with counterpart access information at AE subsystem 400 may enable secure communication of at least that portion of device transfer funds request data 536d between device 100 and AE subsystem 400.

At operation 543, the receiver user identifier of updated device transfer funds request data 538d may be processed by credential protection subsystem 491 to identify at least one receive token that may be associated with that identified receiver user identifier at credential protection subsystem 491. For example, continuing with the primary example introduced above, where the receiver user identifier of updated device transfer funds request data 538*d* may be receiver user identifier U2-ID (e.g., the receiver user identifier that may be identified by device protection subsystem 471 as being associated with the receiver social token LT-2 of device transfer funds request data 536*d* (e.g., in entry 473*b* of table 473)), then credential protection subsystem 491 may be operative at operation 543 to identify each one of receive token RT-2*a* in entry 493*c* and receive token RT-2*b* in entry 493*d* of table 493 as being linked to receiver user identifier U2-ID of updated device transfer funds request data 538*d*. In such instances when there is more than one receive token identified at credential protection subsystem 491 to be associated with the receiver user identifier U2-ID of the device transfer funds request data, then AE subsystem 400 may be operative at operation 544 to communicate with at least one user device that may be associated (e.g., registered at AE subsystem 400) with that receiver user identifier U2-ID in order to determine (e.g., to prompt the user(s) of such device(s) to select) which of the receiver fund accounts associated with the identified receive tokens ought to be used to receive the funds being transferred. For example, using receiver user identifier U2-ID and/or unique electronic device identifier ED2-ID and/or unique user credential identifier PID-2*a* and/or any other suitable data (e.g., in table 473 and/or in table 493) that may be associated with receive token RT-2*a* of entry 493*c*, as well as using receiver user identifier U2-ID and/or unique electronic device identifier ED2-ID and/or unique user credential identifier PID-2*b* and/or any other suitable data (e.g., in table 473 and/or in table 493) that may be associated with receive token RT-2*b* of entry 493*d*, AE subsystem 400 may communicate with device 200 to determine which one of the payment credentials provisioned on device 200 and associated with such unique user credential identifiers PID-2*a* and PID-2*b* (e.g., which one of the payment credential on SSD 254*a* with ST-2*a* and the payment credential on SSD 254*b* with ST-2*b*) ought to be used to determine the funding account that is to receive the funds being transferred. Such a determination may be achieved by providing any suitable prompt to a user of device 200 via any suitable user interface of device 200 (e.g., via a push notification or otherwise to card management application 213*b* or the like) that may enable a user of device 200 to selectively elect a particular one of those provisioned payment credentials in order to identify its associated funding account as the account to receive the funds being transferred. Such a selection by device 200 may return a particular unique user credential identifier (e.g., a selected one of unique user credential identifiers PID-2*a* and PID-2*b*) to AE subsystem 400, and then credential protection subsystem 491 may finally identify the appropriate receive token to use for furthering the fund transaction (e.g., if device 200 selects the provisioned payment credential associated with unique user credential identifier PID-2*a*, then that unique user credential identifier PID-2*a* may be communicated back to AE subsystem 400 at operation 544 and device protection subsystem 491 may utilize receive token RT-2*a* associated with that selected unique user credential identifier PID-2*a* (e.g., from entry 493*c*) to continue with the funding transaction, or, alternatively, if device 200 selects the provisioned payment credential associated with unique user credential identifier PID-2*b*, then that unique user credential identifier PID-2*b* may be communicated back to AE subsystem 400 at operation 544 and device protection subsystem 491 may utilize receive token RT-2*b* associated with that selected unique user credential identifier PID-2*b* (e.g., from entry 493*d*) to continue with the funding transaction). In some embodiments, such a prompt of operation 544 may also enable a user of device 200 to select a new credential to be provisioned on device 200 (e.g., similarly to operation 520) and then device 200 may select that new credential's unique user credential identifier to be communicated to AE subsystem 400 for use in identifying a receive token associated with that new credential's unique user credential identifier. Alternatively, if operation 543 were to occur before any credentials had been provisioned on device 200, such that no receive tokens may be identified by credential protection subsystem 491 (e.g., in table 493) at operation 543 to be associated with the receiver user identifier of updated device transfer funds request data 538*d*, then operation 544 may be similar to operation 520 such that one or more suitable user devices (e.g., device 200) associated with the receiver user identifier of updated device transfer funds request data 538*d* may be prompted to provision a credential thereon, and, in some embodiments, sender device 100 may be simultaneously notified by AE subsystem 400 that the receiver social token of device transfer funds request data 536*d* is not yet associated with an account for receiving the funds and that system 1 is working on a solution. In other embodiments, rather than communicating with one or more receiver devices at operation 544 to determine which of multiple identified receive tokens (e.g., identified from table 493) ought to be used for furthering a fund transaction, AE subsystem 400 may be operative to apply one or more rules or settings to automatically choose one of the identified receive tokens for use (e.g., using pre-defined default and/or user-customized and/or AE-customized settings). For example, a user associated with the multiple receive tokens, or AE subsystem 400, may be operative to define one or more rules to be used for automatically selecting one of the multiple receive tokens using any suitable factors, such as any identifier associated with the sender (e.g., sender user or sender issuing subsystem), the amount of the transfer, the current time of day, day of week, month of year, or any other characteristic(s) of the transfer.

Once a single particular receive token has been identified by credential protection subsystem 491 to be associated with the receiver user identifier of updated device transfer funds request data 538*d* (e.g., at operation 543 with or without operation 544), then credential protection subsystem 491 may communicate that particular receive token along with at least portions of updated device transfer funds request data 538*d* as AE transfer funds request data 546*d* to an appropriate target issuing subsystem at operation 546. For example, continuing with the example where receive token RT-2*a* (e.g., of table entry 493*c*) may be identified by credential protection subsystem 491 as the particular receive token to be used to further the transfer, then that receive token RT-2*a* may be communicated along with any suitable data from updated device transfer funds request data 538*d* as data 546*d* at operation 546 to a particular issuing subsystem. The target issuing subsystem to receive such data 546*d* may be identified by credential protection subsystem 491 at operation 546 by analyzing any suitable information from data 538*d* that may be indicative of the issuing subsystem responsible for the account associated with the provisioned payment credential on device 100 identified by data 536*d* as the account to source the funds of the transfer (e.g., first issuing subsystem 391 that may be associated with send token ST-1*a* of the sender device payment credential data of data 536*d*). AE transfer funds request data 546*d* may include the particular receive token identified at operation 543/544 (e.g., RT-2*a*) as well as any suitable data 536*d*, such as the fund amount data indicative of the selected $50 value, and any suitable sender device payment credential data indicative of the selected provisioned payment credential on device 100 including send token ST-1*a* of SSD 154*a* (e.g., CI-encrypted sender device payment credential data (e.g., ST-1*a* token data and crypto data)). In some embodiments, at least a portion of such AE transfer funds request data 546*d* (e.g., at least a portion of any sender device payment credential data and/or the receive token and/or the amount) may be encrypted using any suitable shared secret of credential protection subsystem 491 and the target issuing subsystem 391 (e.g., any shared secret that may be established at any suitable prior operation (e.g., at operation 508 and/or 512 or otherwise)) by credential protection subsystem 491 at operation 545 prior to communicating data 546*d* to target issuing subsystem 391 at operation 546, after which target issuing subsystem 391 may then decrypt that encrypted portion of received data 546*d* at operation 546. Any such encryption of at least a portion of AE device transfer funds request data 546*d* with an AE-CI shared secret before communication of data 546*d* to CI subsystem 300, followed by any such decryption of such data with an appropriate AE-CI shared secret at CI subsystem 300, may enable secure and trusted communication of at least that portion of device transfer funds request data 546*d* between AE subsystem 400 and CI subsystem 300. For example, any receive token (e.g., RT-2*a*) communicated between AE subsystem 400 and CI subsystem 300 (e.g., as a portion of data 546*d* at operation 546) may first be encrypted with any suitable AE-CI shared secret between subsystems 300 and 400, and CI subsystem 300 may be configured to decrypt such an encrypted receive token using any suitable AE-CI shared secret, such that CI subsystem 300 (e.g., IS 391 and/or IS 392) may be configured to use only a receive token that is part of a validated communication from AE subsystem 400 and not another source. Data 546*d* communicated to issuing subsystem 391 at operation 546 may include the receive token identified by credential protection subsystem 391 at operation 543/544 (e.g., receive token RT-2*a* as identified using one or more links in table 493). Alternatively, the receiver social token identified by AE subsystem 400 at operation 538 and/or a unique user credential identifier PID associated with that receiver social token as may be identified by AE subsystem 400 at operation 543 and/or operation 544 (e.g., rather than a receive token (e.g., by identifying a PID in table 493 that may be associated with a user identifier associated with the receiver social token)) may be communicated to the issuing subsystem 391 (e.g., as a portion of data 546*d* or otherwise) and issuing subsystem 391 may use that receiver social token (e.g., LT-2) and/or that unique user credential identifier (e.g., PID-2*a* or PID-2*b*) to identify at least one receive token associated with that receiver social token at network table 395 at operation 547 (e.g., receive token RT-2*a* and issuing subsystem identifier BID-2 in entry 395*c* and/or receive token RT-2*b* and issuing subsystem identifier BID-1 in entry 395*d*). Therefore, table 395 may be used by the sender issuing subsystem (e.g., first IS 391) to identify the proper receive token (e.g., receive token RT-2*a*) rather than AE subsystem 400 being used to identify the proper receive token (e.g., receive token RT-2*a*), for example, such that AE subsystem 400 may not store any receive token data at AE subsystem 400.

At operation 548, issuing subsystem 391 may process any suitable portion of transfer funds request data 546*d* to potentially validate the transfer of funds from an account of issuing subsystem 391 that may be identified by such data 546*d*. For example, as mentioned, data 546*d* may include CI-encrypted sender device payment credential data generated using ST-1*a* data from the payment credential provisioned on SSD 154*a* of device 100 that, either alone or along with any additional appropriate transfer data (e.g., any suitable fund amount data indicative of the selected $50 value, any suitable sender device data indicative of ED1-ID and/or or the like), may be processed in any suitable manner by issuing subsystem 391, such as by being decrypted (e.g., using credential key 155*a*' at issuing subsystem 391) and analyzed to determine if the account associated with the sender device payment credential data (e.g., the account associated with send token ST-1*a* at subsystem 391) has enough credit or otherwise to cover the amount to be transferred. For example, issuing subsystem 391 may be operative at operation 548 to attempt to validate the sender device payment credential data of transfer funds request data 546*d* in any suitable way in order to determine whether or not to fund the transfer using the account identified by the sender device payment credential data of transfer funds request data 546*d*. As just one example, issuing subsystem 391 may be operative at operation 548 to independently generate crypto data based on the token data of the sender device payment credential data of transfer funds request data 546*d* (e.g., using a shared secret of SSD 154*a* and issuing subsystem 391), compare that generated crypto data to the crypto data of the sender device payment credential data of transfer funds request data 546*d*, and either validate or reject the funding of the transfer based on the comparison. If the sender account is not validated at operation 548, then a transfer rejection notification may be communicated from CI subsystem 300 to AE subsystem 400 at operation 556 using status data 556*d*, and such a status may be shared by AE subsystem 400 with one or more user devices associated with the transfer (e.g., with device 100 as status data 558*d* at operation 558 and/or with device 200 as status data 560*d* at operation 560).

If the sender account is validated and sufficient funds are identified in the validated sender account to meet the specific fund amount from request data 546*d* (e.g., $50) at operation 548, then an account to account transfer may be carried out at operation 550 between issuing subsystem 391 responsible for the validated sender account being used to fund the transfer (e.g., the account identified by account token AT-1*a* associated with the send token ST-1 of data 546*d* as validated at operation 548) and an issuing subsystem (e.g., issuing subsystem 392) associated with the receive token for the transfer (e.g., receive token RT-2*a* identified by subsystem 391 at operation 546 or operation 547) by communicating transfer data 550*d* therebetween. A receive token (e.g., receive token RT-2*a*) may be configured to identify (e.g., to issuing subsystem 391) a particular receiver target issuing subsystem that is responsible for the account associated with that receive token and to be used for receiving the funds of the transfer (e.g., a receive token may be a PAN or a DAR operative to identify a particular receiver target issuing subsystem to which a sender issuing subsystem may conduct an account to account transfer). Transfer data 550*d* may include any suitable fund data operative to transfer at operation 550 the appropriate funds (e.g., $50) from the sender account at issuing subsystem 391, as identified by and associated with the validated send token ST-1A of request data 536*d*/538*d*/546*d* at operation 548, to receiver target issuing subsystem 392, as may be identified by the receive token of the transfer (e.g., receive token RT-2*a*), but also transfer data 550*d* may include at least a portion of the receive token of the transfer itself (e.g., receive token RT-2a). At operation 552, receiver target issuing subsystem 392 may be operative to receive and process transfer data 550d in order to use the receive token of data 550d (e.g., receive token RT-2a) to identify a particular receiver account at receiver target issuing subsystem 392 associated with the receive token of data 550d (e.g., the account associated with account token AT-2a as linked to receive token RT-2a in entry 394a of table 394) and then to add the appropriate funds (e.g., $50) to that identified receiver account using the fund data of data 550d. Therefore, receiver target issuing subsystem 392 may be operative to translate a receive token of data 550d to a particular receiver account token of an entry of table 394 in order to identify the account that is to receive the funds of the transfer. If such an account to account transfer is successful at operations 550 and 552, then a transfer acceptance notification may be communicated from subsystem 392 to subsystem 391 at operation 554 using status data 554d, and then such a status may be shared by CI subsystem 300 with AE subsystem 400 at operation 556 using status data 556d, and such a status may be shared by AE subsystem 400 with one or more user devices associated with the transfer (e.g., with device 100 as status data 558d at operation 558 and/or with device 200 as status data 560d at operation 560). Sender issuing subsystem (e.g., subsystem 391) may only need to know the receive token (e.g., receive token RT-2a) for the transfer, which may be used by the sender issuing subsystem to identify the appropriate target receiver issuing subsystem for operation 550, where the receive token may be in any suitable format routable over any suitable existing network(s) of any CI subsystem 300. The sender issuing subsystem may be operative to maintain a record of what funds it sent to what receive token (e.g., for any suitable record keeping compliance purposes), but the receive token may protect the security and/or privacy of the receiver fund account (e.g., the identity of the account token of the receiver account and/or the identity of any user associated with that account).

Therefore, when a payment credential including a send token ST associated with a particular fund account is provisioned by CI subsystem 300 on a user electronic device that may be registered with AE subsystem 400, CI subsystem 300 may maintain a link between that send token ST and a receive token RT and an account token AT for that particular fund account, where the receive token RT may be shared by CI subsystem 300 with AE subsystem 400 for use in facilitating a secure account to account transfer of funds to that particular fund account. AE subsystem 400 may link the receive token RT to any suitable AE device registration identifier(s) or AE device registration data (e.g., user identifier U-ID and/or electronic device identifier ED-ID and/or social token LT) that may be associated with the user device on which the payment credential (e.g., the linked send token) is provisioned, such that, when AE subsystem 400 receives a request to transfer funds to a receiver identified by any suitable AE device registration data (e.g., a social token LT of a receiver), AE subsystem 400 may be operative to determine a particular receive token RT associated with that identified receiver and then share that particular receive token RT with CI subsystem 300 such that CI subsystem 300 may use that receive token RT to identify to CI subsystem 300 the appropriate fund account to receive the funds of the requested fund transfer. CI subsystem 300 (e.g., IS 392) may only share such a receive token RT with AE subsystem 400 (and/or a network table), and CI subsystem 300 (e.g., IS 392) may be configured only to accept a receive token RT from AE subsystem 400, or, perhaps, from network table 395, in furthering a fund transfer, such that individual user devices may not need to identify or otherwise obtain a receive token RT for carrying out a fund transfer to a receiver account. Such a virtual receive token may not on its own include any data that may be used to access funds from the account associated with the receive token and/or that may be used to identify a particular fund account and/or a particular user. In some embodiments, AE subsystem 400 may maintain two or more distinct subsystems, such as device protection subsystem 471 and credential protection subsystem 491, each of which may maintain links between different types of data, to further limit the types of information that may be determined through analysis of the data at a particular one of those subsystems. For example, as mentioned, device protection subsystem 471 may be operative to maintain a link between two or more types of AE registration data but not between any data and any receive token RT (e.g., an entry of table 473 of device protection subsystem 471 may maintain a link between a social token LT and one or more of a user identifier U-ID and/or an electronic device identifier ED-ID and/or any other suitable AE registration data at AE subsystem 400 that may be associated with a user device registered with AE subsystem 400, but such an entry of table 473 may not maintain any link between such data and any receive token RT), while credential protection subsystem 491 may be operative to maintain a link between a receive token RT and certain types of AE registration data but not between a receive token RT and any social token LT (e.g., an entry of table 493 of credential protection subsystem 491 may maintain a link between a receive token RT and one or more of a user identifier U-ID and/or an electronic device identifier ED-ID and/or any other suitable AE registration data at AE subsystem 400 that may be associated with a user device registered with AE subsystem 400, but such an entry of table 493 may not maintain any link between such data and any social token LT that on its own may identify a particular user (e.g., an e-mail address)). This may enable table 493 of credential protection subsystem 491 to link a receive token RT with data that may not specifically identify a particular user's social token, while at the same time enabling a common data type of table 493 of credential protection subsystem 491 and table 473 of device protection subsystem 471 (e.g., a user identifier U-ID and/or an electronic device identifier ED-ID) to be used by AE subsystem 400 to identify a particular receive token RT for a particular social token LT during a fund transfer process. Alternatively, table 493 of credential protection subsystem 491 and/or table 473 of device protection subsystem 471 may be operative to maintain a link between a receive token RT and a social token LT. For example, table entry 493c of table 493 may include links between RT-2a, U2-ID, ED2-ID, PID-2a, and LT-2, and/or table entry 473b of table 473 may include links between ED2-ID, LT-2, U2-ID, U2-PW, and RT-2a. CI subsystem 300 may be operative to only use a receive token communicated from AE subsystem 400 (or, in some embodiments, from network table 395) for use in identifying a fund account that is to receive funds in a fund transfer. A receive token need not be available to or otherwise used by a user device of system 1. Instead, a sender device may only need to identify a receiver fund account by identifying a receiver social token, and AE subsystem 400 may be operative to securely identify and use a receive token associated with that receiver social token in order to facilitate a transfer of funds from a sender account to a receiver account.

Further steps may be taken to ascertain a fraud risk associated with a particular account to account transfer of funds without maintaining sensitive data linking two particular users and/or user account data for a particular transfer. For example, a sender device (e.g., device 100 in the example of using the payment credential with social token ST-1*a* of SSD 154*a* for transferring $50 from the account of account token AT-1*a* to an account associated with social token LT-2) may be operative to generate and share certain information (e.g., a mandate key) with AE subsystem 400 when sending a transfer request, where such shared information may be unique to the combination of that sender device and the social token LT that the sender device has identified for use in receiving the funds of the transfer, and where such shared information may then be used by AE subsystem 400 (e.g., by transaction protection subsystem 481) to ascertain a fraud risk associated with the transfer and/or to store history data associated with the transfer while not being usable to link a specific sender to a specific receiver at AE subsystem 400. As mentioned, transfer funds request data 536*d* communicated from sender device 100 to AE subsystem 400 may include a mandate key for that transfer request, where that mandate key may be unique to the combination of sender device 100 and the receiver social token (e.g., LT-2) identified in transfer funds request data 536*d*. For example, the mandate key that may be generated by sender device 100 and that may be included as a portion of transfer funds request data 536*d* may be any suitable hash of (i) any suitable unique identifier of device 100 and (ii) the receiver social token of the request, where the unique identifier may be electronic device identifier ED1-ID, user identifier or any other suitable universally unique identifier ("UUID") that may be a unique one-time device generated UUID (e.g., a device transfer unique identifier FX1-ID, which may be stored in entry 173*a* of storage 173 of device 100). Such a device transfer unique identifier FX1-ID may be shared with and used by all devices associated with a particular user account, such that the same mandate key may be generated by both a first user's cellular telephone and that same first user's desktop computer when each device attempts to transfer funds to the same receiver social token. The mandate key generated by sender device 100 (e.g., using any suitable hash function) and communicated from sender device 100 in transfer funds request data 536*d* for a particular receiver social token of a particular fund transfer may or may not be stored on sender device 100.

The mandate key for a particular transfer may be received at credential protection subsystem 491 from device protection subsystem 471 (e.g., as a first portion of transfer funds request data 538*d* that may be initially provided to device protection subsystem 471 from device 100 in data 536*d*) along with an AE account user identifier for the sender (e.g., user identifier U1-ID as a second portion of transfer funds request data 538*d* that may be initially provided to device protection subsystem 471 from device 100 in data 536*d* or determined by device protection subsystem 471 at operation 538) and along with an AE account user identifier for the receiver (e.g., user identifier U2-ID as a third portion of transfer funds request data 538*d* that may be determined by and provided from device protection subsystem 471 at operation 538 (e.g., based on the receiver social token LT-2 of data 536*d* from device 100)). Such a mandate key, sender user identifier, and receiver user identifier of data 538*d* received by credential protection subsystem 491 for a particular transfer may be processed by credential protection subsystem 491 at operation 539 to determine a mandate identifier for the transfer. Such a mandate identifier may be any suitable hash of (i) the mandate key and (ii) the sender user identifier and (iii) the receiver user identifier of data 538*d* for the particular transfer. By generating a mandate identifier based on a mandate key as well as a sender user identifier and/or a receiver user identifier may allow for different mandate identifiers to be generated, respectively, for a first transfer between a first device registered to a first user and a receiver social token associated with a second user and for a second transfer between the first device when registered to a user different than the first user and the receiver social token associated with a user different than the second user (e.g., if a telephone number once associated with a first registered user is later registered to a user different than the first user). The mandate identifier ("MANDATE-ID") generated by credential protection subsystem 491 (e.g., using any suitable hash function) at operation 539 may then be communicated from credential protection subsystem 491 to transaction protection subsystem 481 as a portion of fraud request data 540*d* at operation 540. Fraud request data 540*d* may include any suitable transfer information in addition to the MANDATE-ID, including, but not limited to, the amount of the fund transfer (e.g., $50, as may be indicated by data 538*d*), an identity of the issuing subsystem associated with the sender account of the transfer (e.g., first issuing subsystem 391, as may be identified from data 538*d*), an identity of the issuing subsystem associated with the receiver account of the transfer (e.g., second issuing subsystem 392, as may be indicated by the appropriate receive token for the transfer (e.g., RT-2*a*), as may be identified at operation(s) 543/544, which may occur before operation 540), the date/time of operation 540 and/or of any other suitable operation of the transfer being processed, the location of sender device 100 at the time of operation 536 (e.g., as may be included in data 536*d*), the type of sender device, the device identifier of the sender device, and/or the like. The mandate identifier that may be derived at operation 539 may or may not be stored at credential protection subsystem 491 (e.g., in table 493). Alternatively, in some embodiments, the mandate identifier for the current transfer may be derived at transaction protection subsystem 481, where instead of the mandate identifier being included in data 540*d*, data 540*d* may instead include the mandate key and (ii) the sender user identifier and (iii) the receiver user identifier, and that information may be used by transaction protection subsystem 491 (e.g., using any suitable hash function) to derive the mandate identifier ("MANDATE-ID").

The mandate identifier and any suitable data of fraud request data 540*d* received at transaction protection subsystem 481 (e.g., any suitable transfer information, including the amount of the transfer, the identity of the sender issuing subsystem, the identity of the receiver issuing subsystem, date/time of such data being received at subsystem 481, the location of the sender device, type of sender device, and/or the like) may be stored against each other as new linked data at transaction protection subsystem 481 (e.g., in an entry 483*a* of table 483 of FIG. 4E) at operation 541. Also, at operation 541, transaction protection subsystem 481 may be operative to run any suitable analysis of that fraud request data of the current transfer in conjunction with any previously stored fraud request data of previously processed transfers. For example, transaction protection subsystem 481 may attempt to identify how many other instances of the mandate identifier of the current transfer may be stored at transaction protection subsystem 491 (e.g., in table 483 (not shown)) to determine how many other transfers have been processed for the same combination of sender device and receiver social token as the current transfer and/or to compare the fraud risk data of the current transfer with the fraud risk data of one or more earlier transfers that may share the same mandate identifier (i.e., MANDATE-ID). Any suitable processing may be carried out by transaction protection subsystem 481 at operation 541 to determine one or more fraud risk indicators or a fraud scoring for the current transfer based on at least the mandate identifier for the current transfer and any other suitable data previously obtained by transaction protection subsystem 481 for one or more earlier transfers. The mandate identifier (and/or mandate key) may be used by AE subsystem 400 to uniquely represent the sender/recipient combination of a transfer without requiring AE subsystem 400 to store any data that identifies or may be used to identify the identity of the sender and of the recipient, for example, to protect the privacy of the end users of system 1. Therefore, AE subsystem 400 may maintain trust between senders and receivers, while also retaining certain transaction data for facilitating real-time fraud scoring and detection based on certain transaction history data of each transfer transaction being stored against an identifier (e.g., mandate identifier and/or mandate key) that on its own may not identify a sender or a receiver but that may uniquely represent a particular sender/receiver social token combination. Any suitable fraud detection results from operation 541 may be provided from transaction protection subsystem 481 to credential protection subsystem 491 as at least a portion of fraud risk result data 542d at operation 542, which may then be utilized by credential protection subsystem 491 to determine whether or not to continue processing the current transfer (e.g., whether the fraud detection results meet any suitable threshold for viability or whether the fraud detection results indicate a transfer that ought to be rejected as too risky). If such fraud risk result data 542d does not cause the current transfer to be rejected, at least a portion of such fraud risk result data 542d may be communicated to the sender issuing subsystem as a portion of AE transfer funds request data 546d of operation 546, which may then be used by the sender issuing subsystem at operation 548 (e.g., if the sender issuing subsystem may carry out any additional fraud detection).

Whether an account to account transfer is successful and accepted or rejected and declined at operations 550 and 552, transfer status data 556d indicative of the status of the transfer may be shared with AE subsystem 400 by CI subsystem 300 at operation 556, and AE subsystem 400 may use that status data to send updated fraud risk data 540d for the particular transfer, which may be used by transaction protection subsystem 481 to update its fraud data for the transfer (e.g., to update fraud data stored against MANDATE-ID at entry 483a (e.g., to indicate whether or not that transfer ended up being approved or rejected, etc.), which may then be used at another iteration of operation 541 when analyzing the fraud risk of a later transfer that may be associated with the same MANDATE-ID). Additionally or alternatively, at least a portion of such transfer status data and/or at least a portion of any other data indicative of any features of the transfer may be stored at transaction protection subsystem 481 for use in memorializing a transfer in one or more suitable ways. For example, credential protection subsystem 491 may be operative to generate a unique transfer identifier (e.g., any suitable UUID) that may be unique to a transfer being handled by AE subsystem 400 (e.g., such a transfer identifier may be uniquely generated by AE subsystem 400 at the outset of or at any other moment during the transfer process (e.g., at operation 538, 539, and/or at any other suitable moment during the handling of a particular transfer), and such a transfer identifier ("TRANSFER-ID") may then be used at operation 561 to generate two new distinct transaction identifiers (i.e., a send transaction identifier and a receive transaction identifier). Each one of a send transaction identifier ("SENDX-ID") and a receive transaction identifier ("RECVX-ID") may be generated for the particular transfer in any suitable manner. For example, a send transaction identifier may be any suitable hash (e.g., using any suitable hash function) of (i) the transfer identifier for the current transfer and (ii) a send transaction salt (e.g., random data), while a receive transaction identifier may be any suitable hash (e.g., using any suitable hash function) of (i) the transfer identifier for the current transfer and (ii) a receive transaction salt (e.g., random data), where the send transaction salt and the receive transaction salt may be generated in the same manner or in different manners, while the send transaction salt and the receive transaction salt may differ from one another to decouple the sender side transaction information from the receiver side transaction information for a particular transaction. Although the same send transaction salt may be used for all transactions for all users and/or the same receive transaction salt may be used for all transactions for all users, the send transaction salt may differ from the receive transaction salt such that the sender side transaction information may be decoupled from the receiver side transaction information for a particular transaction, which may enable separate transaction scoring for a sender and for a receiver. Then, any suitable send transaction data (e.g., data 562d-s) of the current transfer may be communicated in association with the SENDX-ID of the current transfer as at least a portion of transaction fraud data 562d to transaction protection subsystem 481 at operation 562, which may then be stored against each other at transaction protection subsystem 481 at operation 563 (e.g., in entry 483b of table 483), while any suitable receive transaction data (e.g., data 562d-r) of the current transfer may be communicated in association with the RECVX-ID of the current transfer as at least a portion of transaction fraud data 562d to transaction protection subsystem 481 at operation 562, which may then be stored against each other at transaction protection subsystem 481 at operation 563 (e.g., in entry 483c of table 483). Such send transaction data 562d-s may be any suitable data associated with the current transfer, including, but not limited to, any suitable sender identifiers (e.g., ED1-ID, etc.), any suitable sender PII (e.g., location of sender device during transaction, country associated with sender device, etc.), any suitable sender features, any suitable receiver features, any suitable receiver aggregates, the amount of the transfer (e.g., $50), a date/timestamp of the transfer (e.g., the time stamp of operation 562), any bank response data, any identifier of the sender issuing subsystem, any suitable identifier of the sender fund account, any identifier of the receiver issuing subsystem, and suitable fraud risk result data 542d, and/or the like. Such receive transaction data 562d-r may be any suitable data associated with the current transfer, including, but not limited to, any suitable receiver identifiers (e.g., social token LT-2), any suitable receiver PII (e.g., location of receiver device during transaction, country associated with receiver device, identifier of receiver device, etc.), any suitable receiver features, any suitable sender features, any suitable sender aggregates, the amount of the transfer (e.g., $50), a date/timestamp of the transfer (e.g., the time stamp of operation 562), any bank response data, any identifier of the sender issuing subsystem, any identifier of the receiver issuing subsystem, any suitable identifier of the receiver fund account, and suitable fraud risk result data 542d, and/or the like. The transfer identifier of the current transaction may or may not be stored or otherwise maintained by credential protection subsystem 491 and/or by any other portion of AE subsystem 400. The transfer identifier for the transfer may also be stored against the mandate identifier and/or the fraud request data (e.g., in entry 483*a*) at operation 541 or otherwise. Alternatively, the transfer identifier may not be retained by transaction protection subsystem 481 so as to prevent any data linking the identity of a sender to the identity of a receiver from being available to transaction protection subsystem 481 particularly and/or to AE subsystem 400 more generally.

Therefore, while AE subsystem 400 (e.g., transaction protection subsystem 481) may be operative to store certain data about a particular transfer transaction, no stored data about a transaction may be operative to link a particular sender to a particular receiver. For example, neither the mandate identifier MANDATE-ID nor fraud request data 540*d* of entry 483*a* of table 483 for a particular transfer may include data operative to be used to link the identity of the particular sender to the particular receiver of the transfer. As another example, neither the send transaction identifier SENDX-ID nor send transaction fraud data 562*d-s* of entry 483*b* of table 483 for a particular transfer may include data operative to be used to link the identity of the particular sender to the particular receiver of the transfer. As yet another example, neither the receive transaction identifier RECVX-ID nor receive transaction fraud data 562*d-r* of entry 483*c* of table 483 for a particular transfer may include data operative to be used to link the identity of the particular sender to the particular receiver of the transfer. However, such stored transfer transaction data may be retained for use in making any suitable fraud risk determination for future transfer transactions (e.g., at a later iteration of operation 541) and/or for use in making any other suitable determinations, including, but not limited to, maintaining a graph to catch and shut down fraud rings without invading privacy of users, determining how much money is being moved through the network during any suitable periods of time, determining how many unique sets of transaction parties have had transfers facilitated, and/or the like without enabling any data available to transaction protection subsystem 481 (e.g., any data in table 483) to be used to answer specific questions about specific users (e.g., specific users and/or specific devices of AE subsystem 400 and/or specific accounts of CI subsystem 300). Therefore, the sender side transaction information may be decoupled from, or not coupled to, the receiver side transaction information for a particular transaction, which may enable separate transaction scoring for a sender and for a receiver.

While a specific funding account of a particular issuing subsystem may only be associated with a single specific account token and a single specific receive token, such a funding account may be associated with two or more unique send tokens, such that the specific funding account may be utilized by two or more different user devices, where each user device may have provisioned thereon a respective one of the unique send tokens associated with that funding account. For example, although not shown in FIG. 1 and/or FIG. 5, system 1 may include a third user device that may be under the control of user U1 similarly to first device 100 (e.g., first device 100 may be user U1's personal portable device and the third device may be user U1's desktop device), and user U1 may provision one or more payment credentials on that third device, where that third device may be associated with user U1 and any suitable registration data registered with AE subsystem 400 (e.g., a third unique electronic device identifier ED3-ID that may be used similarly to but have a different value than first unique electronic device identifier ED1-ID of device 100, a third social token LT-3 that may be used similarly to but have a different value than first social token LT-1 of device 100) that may be linked in table entry 473*c* of table 473 with user U1's account at AE subsystem 400, and that third device may receive and store the same device transfer identifier FX1-ID as first device 100 (e.g., a device transfer identifier FX-ID may be shared across multiple devices that are registered with the same user identifier U-ID at AE subsystem 400) or the third device may generate and store its own unique device transfer identifier (e.g., device transfer identifier FX3-ID). In some embodiments, a credential provisioned on the third device may be associated with the same funding account that is associated with a payment credential provisioned on device 100 (e.g., user U1 would like to have a credential associated with a specific credit card account provisioned on each one of first device 100 and the third device). As a particular example, user U1 may also provision a payment credential that is associated with the funding account for account token AT-1*a* (e.g., as described with respect to provisioning send token ST-1 on first device 100 at operations 504-518) on the third device. For example, although not shown in FIG. 5, process 500 may include an iteration of operations similar to operations 504-516 that may provision such a payment credential on such a third device and that may include various ones of AT-1*a*, ST-3*a*, RT-1*a*, PID-3*a*, U1-ID, ED3-ID, LT-3, BID-1, and/or the like being generated and/or stored in one or more of an entry of storage of the third device, entry 493*e* of table 493, entry 393*d* of table 393, and entry 395*e* of table 395, where send token ST-3*a* may be used similarly to but have a different value than first send token ST-1*a*, unique user credential identifier PID-3*a* may be used similarly to but have a different value than first unique user credential identifier PID-1*a*. Therefore, as shown in FIGS. 4C, 4D, 4F, and 4H, first account token AT-1*a* of a particular funding account may be linked at issuing subsystem 391 (e.g., at table 393) to only one unique receive token RT-1*a*, but such first account token AT-1*a* and/or such unique receive token RT-1*a* may be linked at issuing subsystem 391 (e.g., at table 393) to each one of unique send token ST-1 (e.g., as may be provisioned on first device 100) and unique send token ST-3 (e.g., as may be provisioned on the third device), while such unique receive token RT-1*a* may be linked at network table 395 to each one of unique social token ST-1 of device 100 and social token ST-3 of the third device, while such unique receive token RT-1*a* may be linked at credential protection subsystem 493 (e.g., at table 493) to U1-ID as well as to each one of ED1-ID, ED3-ID, PID-1*a*, and PID-3*a*, and while U1-ID may be linked at device protection subsystem 471 (e.g., at table 473) to each one of LT-1 and LT-3. Therefore, the third device may be used similarly to first device 100 to initiate the transfer of funds from the funding account associated with account token AT-1*a* to another funding account, and/or that funding account associated with account token AT-1*a* may be used to receive funds from another funding account during a transfer of funds identified to be received by a receiver associated with either social token LT-1 of device 100 and/or with social token LT-3 of the third device.

It is understood that the operations shown in process 500 of FIG. 5 are only illustrative and that existing operations may be modified or omitted, additional operations may be added, and the order of certain operations may be altered. Further, in some implementations, two or more operations may occur in parallel or in a different sequence than described. It is to be understood that references to first user U1 and second user U2 may be made for reasons of clarity and not of limitation. For example, in some embodiments, user U1 and user U2 may be the same user using both first device 100 and second device 200 (e.g., to associate one account of that user with device 100 and generate transaction credential data with device 100 for use in funding another account of that user that may be associated with a credential on device 200). Additionally or alternatively, it is to be understood that references to first device 100 and second device 200 may be made for reasons of clarity and not of limitation. For example, in some embodiments, first device 100 and second device 200 may be the same device (e.g., where a first credential associated with a first account may be provisioned on that device and may be used to generate transaction credential data with device 100 for use in funding another account associated with a second credential that is also provisioned on that same device). A unique receive token RT, as associated by CI subsystem 300 with a particular account token AT of a funding account, may only be known to (e.g., available at) CI subsystem 300 and AE subsystem 400, and not to any user device, such as device 100 and device 200. A receive token is not needed to be known by any user or used by any user device in order to carry out a transaction. Instead, a social token may be used by a sender user, and such a social token may be used by AE subsystem 400 and/or CI subsystem 300 to identify an appropriate receive token that may then be used by CI subsystem 300 to identify an appropriate account token for funding an associated funding account. CI subsystem 300 may be configured to carry out a transaction in response to receiving a receive token only from AE subsystem 400 (e.g., as encrypted or otherwise authenticated using a shared secret of CI subsystem 300 and AE subsystem 400) or, in some embodiments, from network table 395 of CI subsystem 300, but not from an other entity, such as a user device. Therefore, a receive token may only be used by CI subsystem 300 to identify an appropriate fund account to receive funds, such that a receive token may not be useful to any other entity (e.g., an attacker or spoofer or other potential bad actor). A sender user may be enabled at a sender user device (e.g., device 100) to send funds from an account associated with the sender user to an account associated with a receiver user by only identifying a social token of the receiver and without registering with or even realizing it may be using a specific fund facilitation service. Instead, as one example, a sender user may interact with a messaging communication application on the sender user's device (e.g., an instant messaging software application, such as Messages by Apple Inc.) by merely selecting a particular receiver user to communicate with (e.g., by selecting an appropriate receiver social token, such as telephone number or e-mail address) and by entering any suitable communication message (e.g., text and/or emojis and/or the like) to be communicated to that particular user receiver along with any suitable fund amount (e.g., $50). A default send token may be utilized by the sender user's device (e.g., in response to some user authentication event) and communicated with the suitable communication message from the sender user's device for the benefit of the particular receiver identified by the elected receiver social token. The sender user need not be aware of any receive token or any receiver bank information, as the messaging communication application and AE subsystem 400 and CI subsystem 300 may handle the facilitation of the fund transfer and the communication of the communication message to the receiver user transparent to the sender user.

Further Description of FIGS. 1-5

One, some, or all of the processes described with respect to FIGS. 1-5 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 104 and/or memory module 150 of FIG. 2). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device or subsystem to another electronic device or subsystem using any suitable communications protocol (e.g., the computer-readable medium may be communicated to electronic device 100 via communications component 106 (e.g., as at least a portion of an application 103 and/or as at least a portion of an application 113 and/or as at least a portion of an application 143)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of system 1 may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

At least a portion of one or more of the modules or components or subsystems of system 1 may be stored in or otherwise accessible to an entity of system 1 in any suitable manner (e.g., in memory 104 of device 100 (e.g., as at least a portion of an application 103 and/or as at least a portion of an application 113 and/or as at least a portion of an application 143)). For example, any or each module of NFC component 120 may be implemented using any suitable technologies (e.g., as one or more integrated circuit devices), and different modules may or may not be identical in structure, capabilities, and operation. Any or all of the modules or other components of system 1 may be mounted on an expansion card, mounted directly on a system motherboard, or integrated into a system chipset component (e.g., into a "north bridge" chip).

Any or each module or component of system 1 (e.g., any or each module of NFC component 120 and/or any or each or each module of an NFC component of device 200) may be a dedicated system implemented using one or more expansion cards adapted for various bus standards. For example, all of the modules may be mounted on different interconnected expansion cards or all of the modules may be mounted on one expansion card. With respect to NFC component 120, by way of example only, the modules of NFC component 120 may interface with a motherboard or processor 102 of device 100 through an expansion slot (e.g., a peripheral component interconnect ("PCI") slot or a PCI express slot). Alternatively, NFC component 120 need not be removable but may include one or more dedicated modules that may include memory (e.g., RAM) dedicated to the utilization of the module. In other embodiments, NFC component 120 may be integrated into device 100. For example, a module of NFC component 120 may utilize a portion of device memory 104 of device 100. Any or each module or component of system 1 (e.g., any or each module of NFC component 120) may include its own processing circuitry and/or memory. Alternatively, any or each module or component of system 1 (e.g., any or each module of NFC component 120) may share processing circuitry and/or memory with any other module of NFC component 120 and/or processor 102 and/or memory 104 of device 100.

The present disclosure recognizes that the use of such personal information data, in the present technology, such as current location of device 100 and/or device 200, can be used to the benefit of users. For example, the personal information data can be used to provide better security and risk assessment for a financial transaction being conducted. Accordingly, use of such personal information data enables calculated security of a financial transaction. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps or conduct certain operations for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of financial transaction services, the present technology can be configured to allow users to select to "opt in" or "opt out" of participation in the collection of personal information data during registration for such services. In another example, users can select not to provide location information for financial transaction services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, financial transaction services can be provided by inferring preferences or situations based on non-personal information data or a bare minimum amount of personal information, such as the financial transaction being conducted by the device associated with a user, other non-personal information available to the financial transaction services, or publicly available information.

FURTHER APPLICATIONS OF DESCRIBED CONCEPTS

While there have been described systems, methods, and computer-readable media for facilitating a fund transfer between user accounts, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A server device comprising:
a memory; and
at least one processor configured to:
facilitate, in conjunction with a first credential issuing system, provisioning of a first account primary credential on a first electronic device, the first account primary credential corresponding to a first funding account at the first credential issuing system;
receive, in conjunction with the provisioning, a first account secondary credential corresponding to the first funding account at the first credential issuing system;
store the first account secondary credential in association with a first user account identifier corresponding to a first user of the first electronic device, and a first user communication identifier corresponding to the first user of the first electronic device;
receive, from a second electronic device corresponding to a second user account identifier, a request to send a fund amount to the first user communication identifier using a second account primary credential provisioned on the second electronic device, wherein the request comprises a client obfuscated transfer identifier corresponding to a device identifier of the second electronic device and to the first user communication identifier;

retrieve, using the first user communication identifier, the first user account identifier and the first account secondary credential;

generate, based at least in part on the client obfuscated transfer identifier, the first user account identifier and the second user account identifier, a server obfuscated transfer identifier;

determine, based at least in part on the server obfuscated transfer identifier, a fraud risk associated with the request to send the fund amount, the fraud risk being specific to the second electronic device, the first user communication identifier, the first user account identifier and the second user account identifier;

when the determined fraud risk meets a predetermined threshold:

provide, to a second credential issuing system corresponding to the second account primary credential, a request to transfer the fund amount, the request comprising the first account secondary credential, the second account primary credential, and an indication of the fund amount;

receive, from the second credential issuing system, an indication of whether the transfer was completed; and store the indication of whether the transfer was completed in association with the server obfuscated transfer identifier; and when the determined fraud risk fails to meet the predetermined threshold, store the determined fraud risk in association with the server obfuscated transfer identifier.

2. The server device of claim 1, wherein the at least one processor is further configured to:

receive, from the first electronic device, a request to provision the first account primary credential on the first electronic device, the request comprising the first user account identifier and the first user communication identifier.

3. The server device of claim 1, wherein the at least one processor is further configured to:

receive, from the second electronic device, a request to provision the second account primary credential on the second electronic device, the request comprising the second user account identifier corresponding to a second user of the second electronic device and a second user communication identifier corresponding to the second user of the second electronic device;

facilitate, in conjunction with the second credential issuing system, provisioning of the second account primary credential on the second electronic device, the second account primary credential corresponding to a second funding account at the second credential issuing system;

receive, from the second credential issuing system and in conjunction with the provisioning, a second account secondary credential corresponding to the second funding account at the second credential issuing system; and store the second account secondary credential in association with the second user account identifier and the second user communication identifier.

4. The server device of claim 3, wherein the first electronic device is registered, at the server device, to the first user account identifier and the second electronic device is registered, at the server device, to the second user account identifier.

5. The server device of claim 1, wherein the first user communication identifier comprises at least one of an email address or a telephone number.

6. The server device of claim 1, wherein the at least one processor is further configured to determine, based at least in part on the server obfuscated transfer identifier, the fraud risk associated with the request to send the fund amount by:

transmitting, to another sever device, a fraud risk request, the fraud risk request comprising the obfuscated server transfer identifier and transfer information; and receiving, from the other server device, an indication of the fraud risk associated with the request to send the fund amount.

7. The server device of claim 6, wherein the device identifier of the second electronic device, the first user communication identifier, the first user account identifier and the second user account identifier are not provided to, and are in accessible to, the other server device.

8. The server device of claim 6, wherein the transfer information comprises at least one of: the fund amount, an identifier of a second credential issuing system corresponding to the second account primary credential, an identifier of the first credential issuing system, a location of the second electronic device, or a type of the second electronic device.

9. The server device of claim 6, wherein the at least one processor is configured to store the determined fraud risk in association with the server obfuscated transfer identifier by:

transmitting, to the other server device, the determined fraud risk and the server obfuscated transfer identifier for storage.

10. The server device of claim 6, wherein the server device, the other server device, the first electronic device, the second electronic device, the first credential issuing system, and the second credential issuing system are separate devices.

11. The server device of claim 1, wherein the at least one processor is configured to provide, to the second credential issuing system in conjunction with the request to transfer, an identifier of the first credential issuing system.

12. A method comprising:

at an administration entity system:

facilitating, in conjunction with a first credential issuing system, provisioning of a first account primary credential on a first electronic device, the first account primary credential corresponding to a first funding account at the first credential issuing system;

receiving, in conjunction with the provisioning, a first account secondary credential corresponding to the first funding account at the first credential issuing system;

storing the first account secondary credential in association with a first user account identifier corresponding to a first user of the first electronic device, and a first user communication identifier corresponding to the first user of the first electronic device;

receiving, from a second electronic device corresponding to a second user account identifier, a request to send a fund amount to the first user communication identifier using a second account primary credential provisioned on the second electronic device;

retrieving, using the first user communication identifier, the first account secondary credential;

providing, to a second credential issuing system corresponding to the second account primary credential, a request to transfer the fund amount, the request comprising the first account secondary credential, the second account primary credential, an indication of the fund amount, and an identifier of the first credential issuing system; and receiving, from the second credential issuing system, an indication of whether the transfer was completed.

13. The method of claim 12, wherein the request to send the fund amount further comprises a client obfuscated transfer identifier corresponding to a device identifier of the second electronic device and the first user communication identifier, and the method further comprises:

generating, based at least in part on the client obfuscated transfer identifier, the first user account identifier and the second user account identifier, a server obfuscated transfer identifier; and determining, based at least in part on the server obfuscated transfer identifier, a fraud risk associated with the request to send the fund amount, the fraud risk being specific to the second electronic device, the first user communication identifier, the first user account identifier and the second user account identifier.

14. The method of claim 13, wherein providing, to the second credential issuing system corresponding to the second account primary credential, the request to transfer the fund amount comprises:

when the determined fraud risk meets a predetermined threshold:

providing, to the second credential issuing system corresponding to the second account primary credential, the request to transfer the fund amount; and storing the indication of whether the transfer was completed in association with the server obfuscated transfer identifier.

15. The method of claim 13, wherein the first electronic device is registered, at the administration entity system, to the first user account identifier and the second electronic device is registered, at the administration entity system, to the second user account identifier.

16. The method of claim 13, wherein the first user communication identifier comprises at least one of an email address or a telephone number.

17. A system comprising:

a memory configured to store a first account secondary credential in association with a first user account identifier corresponding to a first user of a first electronic device, and to store a first user communication identifier corresponding to the first user of the first electronic device, wherein the first account secondary credential corresponds to a first funding account at a first credential issuing system;

at least one processor configured to:

receive, from a second electronic device corresponding to a second user account identifier, a request to send a fund amount to the first user communication identifier using a second account primary credential provisioned on the second electronic device, wherein the request comprises a client obfuscated transfer identifier and encrypted secondary account primary credential data;

retrieve, using the first user communication identifier, the first account secondary credential;

determine, based at least in part on the client obfuscated transfer identifier, a fraud risk associated with the request to send the fund amount, the fraud risk being specific to the second electronic device, the first user communication identifier, the first user account identifier and the second user account identifier; and when the determined fraud risk meets a predetermined threshold:

provide, to a second credential issuing system corresponding to the second account primary credential, a request to transfer the fund amount, the request comprising the first account secondary credential associated with the first user communication identifier, the encrypted second account primary credential data, and an indication of the fund amount;

receive, from the second credential issuing system, an indication of whether the transfer was completed; and store the indication of whether the transfer was completed in association with the client obfuscated transfer identifier.

18. The system of claim 17, wherein the client obfuscated transfer identifier corresponds to a device identifier of the second electronic device and the first user communication identifier.

19. The system of claim 18, wherein the at least one processor is further configured to:

generate, based at least in part on the client obfuscated transfer identifier, the first user account identifier and the second user account identifier, a server obfuscated transfer identifier, wherein the indication of whether the transfer was completed is further stored in association with the server obfuscated transfer identifier.

20. The system of claim 19, wherein the encrypted second account primary credential data is encrypted using a key that is accessible to the second credential issuing system and is inaccessible to the system.

* * * * *